(12) United States Patent  (10) Patent No.: US 7,992,669 B2
Odate et al.  (45) Date of Patent: Aug. 9, 2011

(54) VEHICLE SEAT BELT APPARATUS AND CONTROL METHOD THEREFOR

(75) Inventors: Shotaro Odate, Wako (JP); Yo Ito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 554 days.

(21) Appl. No.: 11/810,570

(22) Filed: Jun. 6, 2007

(65) Prior Publication Data

US 2007/0284174 A1   Dec. 13, 2007

(30) Foreign Application Priority Data

Jun. 9, 2006  (JP) ................................ 2006-161572
Mar. 14, 2007 (JP) ................................ 2007-065382

(51) Int. Cl.
  *B60R 22/46*  (2006.01)
(52) U.S. Cl. ..................................... 180/268; 701/45
(58) Field of Classification Search .............. 180/268; 280/806, 807; 701/45; 242/374
  See application file for complete search history.

(56) References Cited

U.S. PATENT DOCUMENTS

| | | | |
|---|---|---|---|
| 6,533,321 B2 | 3/2003 | Class et al. | |
| 2001/0025735 A1* | 10/2001 | Midorikawa et al. | 180/268 |
| 2003/0114973 A1 | 6/2003 | Takagi et al. | |
| 2003/0178836 A1* | 9/2003 | Viano et al. | 280/806 |
| 2003/0209900 A1* | 11/2003 | Tobata | 280/807 |
| 2004/0060762 A1* | 4/2004 | Tobata | 180/268 |
| 2005/0082410 A1* | 4/2005 | Tanaka et al. | 242/390.8 |
| 2005/0209755 A1 | 9/2005 | Sugiura | |
| 2005/0252710 A1 | 11/2005 | Akaba et al. | |
| 2006/0097504 A1 | 5/2006 | Akaba et al. | |
| 2006/0103192 A1 | 5/2006 | Norton | |
| 2006/0195231 A1* | 8/2006 | Diebold et al. | 701/1 |
| 2006/0220368 A1* | 10/2006 | Takao et al. | 280/801.1 |
| 2007/0021892 A1 | 1/2007 | Takemura | |

FOREIGN PATENT DOCUMENTS

| | | |
|---|---|---|
| EP | 1 104 721 A2 | 6/2001 |
| EP | 1 586 490 A1 | 10/2005 |
| EP | 1 745 995 A1 | 1/2007 |
| JP | 2001-122081 | 5/2001 |
| JP | 2004-291967 | 10/2004 |
| WO | WO 96/30235 | 10/1996 |
| WO | WO 2004/065182 A1 | 8/2004 |

* cited by examiner

*Primary Examiner* — John Q Nguyen
*Assistant Examiner* — Rodney King
(74) *Attorney, Agent, or Firm* — Carrier Blackman & Associates, P.C.; Joseph P. Carrier; William D. Blackman

(57) ABSTRACT

Vehicle seat belt apparatus includes an electric-type pretensioner that includes a motor for rotationally driving a belt reel to take up a belt. The apparatus also includes: a take-up position detection section for detecting a take-up position of the reel; a traveling condition determination section for determining that a traveling condition of the vehicle has varied to a predetermined condition; and a control section for controlling power supply to the motor, on the basis of a signal output from the determination section, to thereby control a driving amount of the motor but also for controlling the reel, in accordance with a detection signal output by the take-up position detection section, so that the reel is kept at a predetermined take-up position, to thereby hold a vehicle occupant in a seat with the belt.

11 Claims, 13 Drawing Sheets

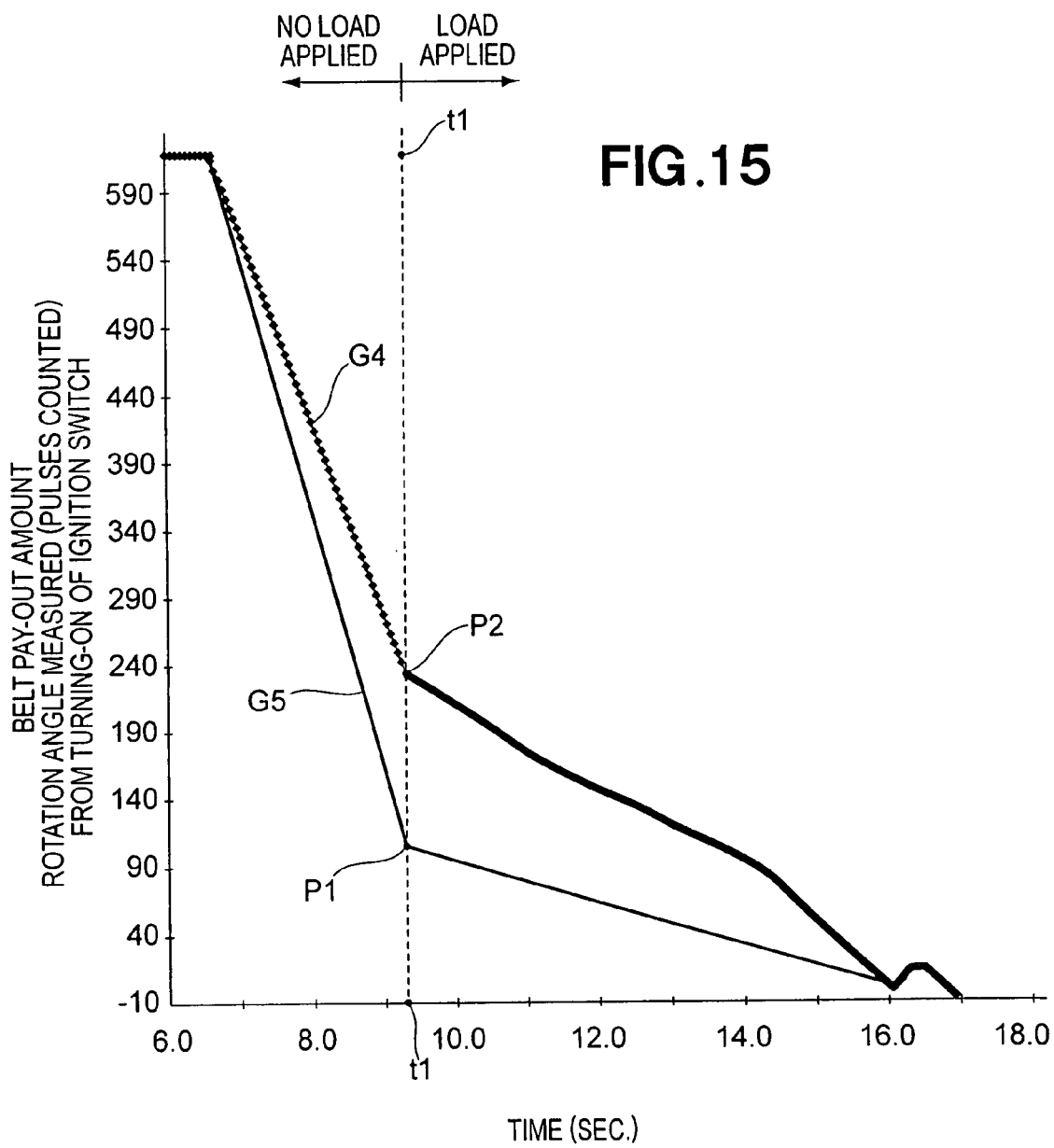

VEHICLE SEAT BELT APPARATUS AND CONTROL METHOD THEREFOR

FIELD OF THE INVENTION

The present invention relates generally to vehicle seat belt apparatus and control methods therefor. More particularly, the present invention relates to an improved vehicle seat belt apparatus and control method therefor which are suited to optimize a take-up amount of the seat belt so as to prevent excessive belt tension from being applied to a vehicle occupant due to a behavioral change, such as acceleration, of the vehicle during travel of the vehicle.

BACKGROUND OF THE INVENTION

In the field of vehicle seat belt apparatus, there has been used in recent years a technique for, in an emergency or during unstable travel of the vehicle, holding or restraining a vehicle occupant to a seat with a seat belt to thereby limit a posture change of the vehicle occupant. However, in the conventional seat belt apparatus based on such a technique, which are mainly intended to protectively restrain the vehicle occupant to a seat and support the vehicle occupant against a posture change, the vehicle-occupant holding or restraining force would sometimes become excessively great, and there is a need to provide a separate tension sensor for detecting tension of the belt with a view to optimizing the vehicle-occupant restraining force. Further, in a case where control is performed to produce predetermined belt tension, the conventional seat belt apparatus can not restrain a vehicle occupant stably with a small force. Because frequent activation of the seat belt apparatus (i.e., vehicle-occupant restraining operation) increases a feeling of discomfort of the vehicle occupant, it has been necessary to limit a frequency of activation of the vehicle-occupant restraining operation, for example, by activating the vehicle-occupant restraining operation only in emergent situations and preventing the vehicle-occupant restraining operation from being activated during normal traveling of the vehicle.

Among various prior art literatures disclosing such vehicle seat belt apparatus are Japanese Patent Application Laid-Open Publication Nos. 2004-291967 (hereinafter "Patent Literature 1") and 2001-122081 (hereinafter "Patent Literature 2"). Namely, Patent Literature 1 discloses a vehicle-occupant restraining/protecting system which is arranged to protectively restrain a vehicle occupant with an enhanced efficiency by controlling the restraining operation with a condition of the vehicle taken into account. Patent Literature 2 discloses a vehicle-occupant restraining/protecting system which is arranged to protect a vehicle occupant with an enhanced efficiency by activating a pretensioner of the seat belt apparatus, for example, when the vehicle body is slipping sideways or the driven wheels are running idle during travel of the vehicle.

However, the conventional vehicle seat belt apparatus can not meet both the request that a posture change of a vehicle occupant be limited by the vehicle-occupant restraining operation in an emergency and the request that comfort of the vehicle occupant be enhanced by properly controlling production of the vehicle-occupant restraining force. Particularly, once the belt tension suddenly changes due to a posture change of the vehicle occupant or the like, the conventional vehicle seat belt apparatus tend to produce belt tension uncomfortable for the vehicle occupant, in order to control the belt tension to a target tension level. Also, in a case where a posture change of the vehicle occupant occurs frequently, there would arise other inconveniences, such as slack produced in the belt or residual tension remaining in the belt to undesirably keep the belt taut.

SUMMARY OF THE INVENTION

In view of the foregoing prior art problems, it is an object of the present invention to provide an improved vehicle seat belt apparatus and control method therefor which can greatly enhance comfort of a vehicle occupant by minimizing a vehicle-occupant restraining force of a seat belt, assisting a posture change of the vehicle occupant with a supporting force of the seat belt and permitting selection of an appropriate supporting force of the belt, and which can effectively minimize discomfort of the vehicle occupant even where a vehicle-occupant restraining operation is activated at a high frequency in low-risk situations, e.g. in turning movement of the vehicle.

In order to accomplish the above-mentioned object, the present invention provides an improved vehicle seat belt apparatus including an electric-type pretensioner that includes a belt reel and a motor for rotationally driving the belt reel to take up a belt, which comprises a take-up position detection section for detecting a take-up position of the belt reel; a traveling condition detection section for detecting a traveling condition of the vehicle; a traveling condition determination section for determining, on the basis of a detection signal output by the traveling condition detection section, that the traveling condition of the vehicle has varied to a predetermined condition; and a control section for controlling power supply to the motor, on the basis of a determination signal output by the traveling condition determination section, to thereby control a driving amount of the motor and for controlling, in accordance with the detection signal output by the take-up position detection section, the belt reel so that the belt reel is kept at a predetermined take-up position, to thereby hold a vehicle occupant with the belt.

Namely, the control section performs two types of control: first control for controlling the power supply to the belt-reel driving motor, and hence the driving amount of the motor, in accordance with variation of the traveling condition of the vehicle, e.g., in an emergency; and second control for controlling the belt reel, in accordance with an actual current take-up position of the belt reel, to allow the belt reel to be kept at a predetermined take-up position, in order to achieve enhanced comfort of the vehicle occupant. The second control is one of the novel features of the present invention, which is primarily intended to constantly keep a proper posture of the vehicle occupant in a manner comfortable for the vehicle occupant. More specifically, the seat belt apparatus of the present invention has a control mode, corresponding to the second control, for keeping the belt reel at a predetermined take-up position in accordance with an actual current take-up position of the belt reel, not necessarily in response to variation in the traveling condition of the vehicle. Thus, in a case where some variation has occurred in the traveling condition of the vehicle but the belt has not been actually paid out a substantial amount beyond a predetermined taken-up position in response to the variation in the traveling condition, the control section can control the belt reel (according to the second control scheme) in such a manner that the belt will not be taken up substantially and thus will not impart the vehicle occupant with uncomfortable belt tension exceeding a certain tension level. Note that the conventional apparatus were constructed so that, even in such a case, the belt reel takes up the belt to protectively restrain the vehicle occupant, and thus, uncomfortable belt tension would be applied to the vehicle occupant. Further, with the present invention, where the belt is not taken up beyond the predetermined take-up position, the vehicle occupant can be prevented from being restrained by the belt more than necessary.

Preferably, the predetermined take-up position is a position where the belt fits the body of the vehicle occupant substantially without slack.

Preferably, once the take-up position detection section detects that the belt reel has rotated in a belt paying-out direction during a vehicle-occupant holding operation by the belt reel, the control section increases the power supply to the motor.

Preferably, once the take-up position detection section detects that the belt reel has rotated in a belt taking-up direction during the vehicle-occupant holding operation by the belt reel, the control section reduces the power supply to the motor.

Preferably, the vehicle seat belt apparatus of the present invention further comprises a rotation angle velocity detection section for detecting a variation rate of a rotation angle of the belt reel, and, when the rotation angle of the belt reel has varied during the vehicle-occupant holding operation by the belt reel, the control section varies an increase/decrease amount of the power supply to the motor in accordance with the rotation angle velocity of the belt reel detected by the rotation angle velocity detection section.

Preferably, on the basis of an amount of the traveling condition detected by the traveling condition detection section, the control section varies the predetermined take-up position and/or an increase/decrease amount of the power supply to the motor during the vehicle-occupant holding operation by the belt reel.

Preferably, the vehicle seat belt apparatus of the present invention further comprises a turning direction detection section for detecting a turning direction of the vehicle, and, when the turning direction of the vehicle has varied during the vehicle-occupant holding operation by the belt reel, the control section varies, in accordance with the turning direction detected by the turning direction detection section, the predetermined take-up position and/or the increase/decrease amount of the power supply to the motor during the vehicle-occupant holding operation by the belt reel.

Preferably, the vehicle seat belt apparatus of the present invention further comprises a vehicle occupant detection section for detecting the vehicle occupant, and the control section varies, in accordance with vehicle occupant information detected by the vehicle occupant detection section, the predetermined take-up position and/or the increase/decrease amount of the power supply to the motor during the vehicle-occupant holding operation by the belt reel.

Preferably, the vehicle seat belt apparatus of the present invention further comprises an operation section for varying the predetermined take-up position and/or the increase/decrease amount of the power supply to the motor during the vehicle-occupant holding operation by the belt reel.

Preferably, the vehicle seat belt apparatus of the present invention further comprises a road surface friction coefficient detection section for detecting a road surface friction coefficient. On the basis of information related to the road surface friction coefficient detection detected by the road surface friction coefficient detection section, the control section sets the predetermined take-up position, or the increase/decrease amount of the power supply to the motor during the vehicle-occupant holding operation by the belt reel, to a smaller value when a smaller road surface friction coefficient is detected by the road surface friction coefficient detection section.

Preferably, the vehicle seat belt apparatus of the present invention further comprises a target take-up position correction section for not only inhibiting increase of the power supply responsive to variation in the predetermined take-up position during the vehicle-occupant holding operation by the belt reel, but also re-setting a target take-up position by increasing/decreasing the predetermined take-up position.

According to another aspect of the present invention, there is provided a control method for a vehicle seat belt apparatus including an electric-type pretensioner that includes a belt reel and a motor for rotationally driving the belt reel to take up a belt, which comprises: a target value setting step of setting a control target rotational position of the belt reel; a step of detecting an actual current rotational position of the belt reel; a step of determining a difference between the control target rotational position and the actual current rotational position; and a step of determining power supply to the motor such that the difference between the control target rotational position and the actual current rotational position approaches zero.

Preferably, the target value setting step includes a step of determining an increase/decrease amount of the power supply in accordance with a value of the difference.

Preferably, the target value setting step includes a step of setting the control target rotational position of the belt reel in accordance with an amount of variation in a traveling condition of the vehicle.

Preferably, the target value setting step includes a step of correcting the control target rotational position of the belt reel.

Preferably, the control method of the present invention further comprises a step of determining an upper limit of the power supply on the basis of an amount of variation in the traveling condition of the vehicle or a value of the difference between the control target rotational position and the actual current rotational position.

The present invention can not only effectively minimize the restraint, by the seat belt, of the vehicle occupant, using the take-up position detection section etc., but also assist a human driver in driving the vehicle by allowing a supporting force to appropriately act in response to a posture change or positional shift of the vehicle. Further, by appropriately selecting the supporting force, the present invention allows the seat belt apparatus to be kept attached to the body of the vehicle occupant with enhanced comfort. Further, the present invention can increase/decrease the supporting force in such a manner as to minimize a feeling of discomfort of the vehicle occupant.

BRIEF DESCRIPTION OF THE DRAWINGS

Certain preferred embodiments of the present invention will hereinafter be described in detail, by way of example only, with reference to the accompanying drawings, in which:

FIG. 15 is a waveform diagram showing results obtained on the basis of the operation control shown in FIG. 13.

DETAILED DESCRIPTION OF THE PREFERRED EMBODIMENTS

Figure 1:
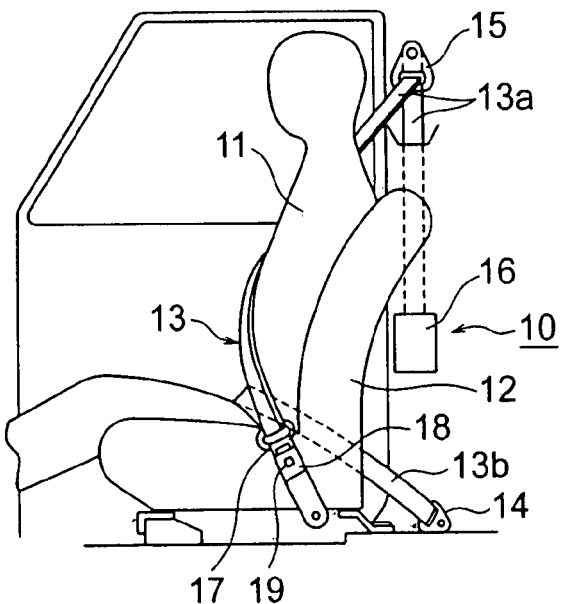
FIG. 1 is a side view showing a vehicle seat belt apparatus according to an embodiment of the present invention.
Figure 2:
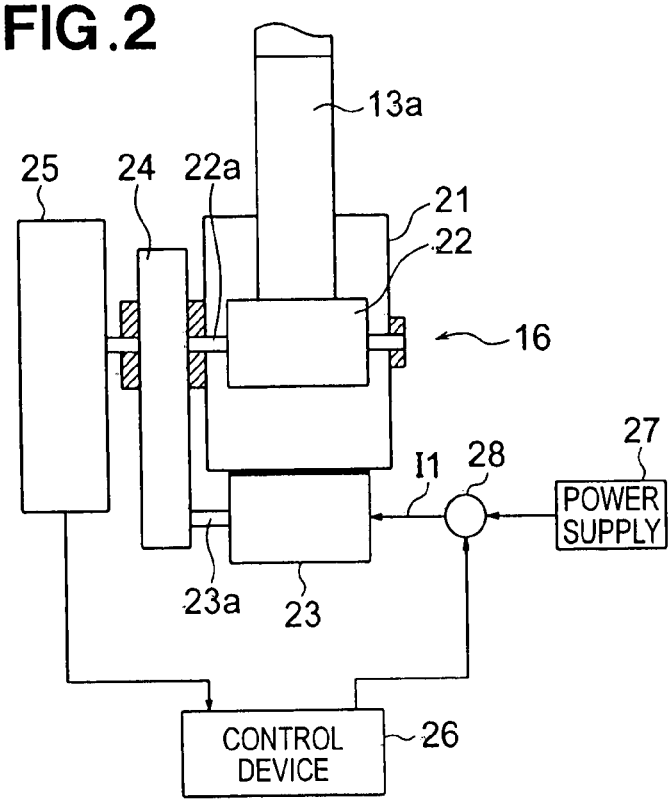
FIG. 2 is a block diagram showing an example setup of a seat belt retractor employed in the seat belt apparatus according to the embodiment.
Figure 3:
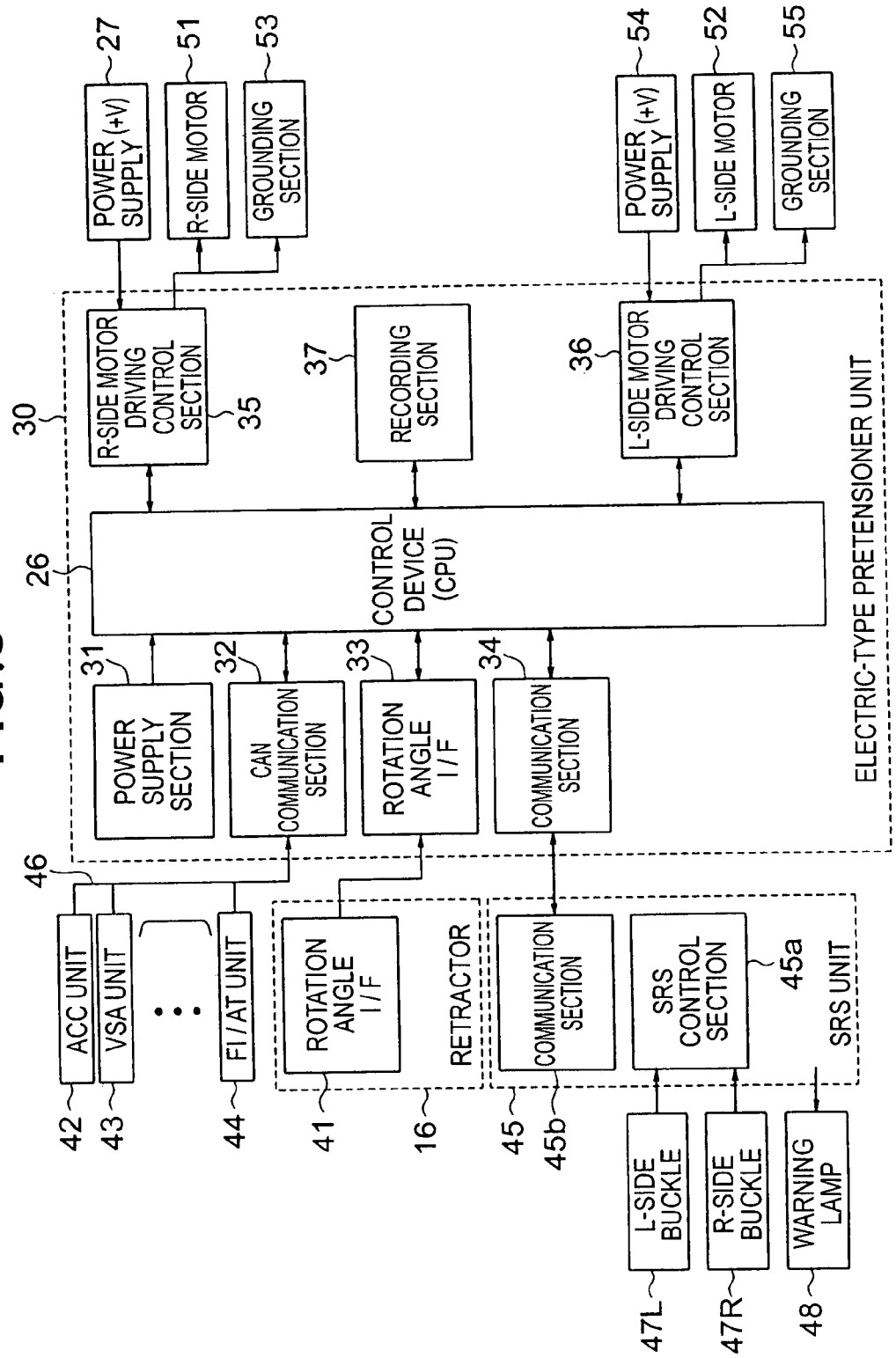
FIG. 3 is a block diagram showing an example general setup of a control system for controlling the seat belt apparatus according to the embodiment.

FIG. 1 shows a seat belt apparatus 10 according to an embodiment of the present invention which is provided on, for example, a driver seat of a vehicle, FIG. 2 shows an example construction of a seat belt retractor employed in the embodiment, and FIG. 3 is a block diagram showing a control system for controlling the seat belt apparatus 10.

In FIG. 1, the seat belt apparatus 10 includes a belt (webbing) 13 for restraining the body of a vehicle occupant 11 to the seat 12. The belt 13, which is in the form of a three-point supporting structure, includes an upper belt portion 13a for restraining an upper body portion of the vehicle occupant 11, and a lower belt portion 13b for restraining a waist portion of the vehicle occupant 11. The lower belt portion 13b is connected at one end to a vehicle body portion, located in a lower area of a vehicle compartment, by means of an anchor plate 14. The upper belt portion 13a is folded back via a through-anchor 15 provided near a shoulder of the vehicle occupant 11, and it is connected at one end to a belt reel 22 of a retractor 16. Tongue plate 17 is attached to a region of the belt 13 where respective distal ends of the upper and lower belt portions 13a and lower belt portion 13 merge with each other. The tongue plate 17 is detachably attachable to a buckle 18 fixed to one side of a lower seat section of the seat 12, and a buckle switch 19 for detecting connection, to the buckle 18, of the tongue plate 17 is provided in the buckle 18.

FIG. 2 shows an example setup of primary (or relevant) sections of the seat belt retractor 16. The retractor 16 includes the belt reel (spindle) 22 rotatably mounted in a housing 21, and a motor 23 for rotationally driving the belt reel 22. The upper belt portion 13a is connected at the one end to the belt reel 22 as noted above, so that it is taken up by the belt reel 22. The belt reel 22 has a shaft 22a connected, via a power transmission mechanism (e.g., gear mechanism) 24, to a drive shaft 23a of the motor 23; thus, the belt reel 22 is rotationally driven by the motor 23 via the power transmission mechanism 24. The retractor 16 also includes a take-up position detection section 25 connected to the shaft 22a of the belt reel 22.

The take-up position detection section 25 preferably includes a rotation angle sensor that is, for example, in the form of a magnetic sensing unit comprising a combination of a magnetic disk and two Hall ICs. Minimum resolution of the rotation angle sensor is, for example, 4° that is in the order of about 1.3-1.6 mm in terms of the length of the belt. The rotation angle sensor may be replaced with a belt length sensor.

The take-up position detection section 25 is capable of detecting a take-up position of the belt reel 22 by detecting a rotation angle of the belt reel 22 by means of the rotation angle sensor contained therein. Take-up position detection signal output from the take-up position detection section 25 is supplied to a control device 26. Operation of the retractor 16 is controlled by the control device 26. More specifically, the control device 26 controls the belt taking-up operation of the retractor 16 by controlling, by means of a power supply adjustment section 28, an amount of a driving current I1 to be supplied from a power supply 27 to the motor 23. The retractor 16 controlled by the control device 26 is constructed as an electric-type pretensioner for holding the vehicle occupant 11 in a proper posture and position.

Whereas the seat belt apparatus 10 and the retractor 16 etc. included in the seat belt apparatus 10 have been described above as provided on the driver seat, a similar seat belt apparatus 10, retractor 16, etc. are also provided on a front passenger seat. In the following description, some components provided on the driver seat will be mentioned with a prefix "R-side apparatus", while some components provided on the front passenger seat will be mentioned with a prefix "L-side.

With reference to FIG. 3, the following paragraphs describe an example general hardware setup of the control system for controlling the seat belt apparatus 10 etc.

In FIG. 3, the above-described control device 26 is in the form of a CPU. Block 30 including the control device 26 represents an electric-type pretensioner unit for allowing the vehicle occupant 11 to be kept in a proper position and posture by means of the seat belt. The block 30 also includes, at an input side of the control device 26, a power supply section 31, in-vehicle network (commonly known as "CAN" or "Controller Area Network") communication section 32, rotation angle interface (I/F) section 33 and communication section 34. The block 30 also includes, at an output side of the control device 26, an R-side motor driving control section 35, L-side motor driving control section 36 and recording section 37 that is in the form of a memory storing data, programs, etc.

Further, at an input side of the block 30, there is provided a block representing the retractor 16 as an example seat belt retractor employed in the instant embodiment. The retractor 16 includes a rotation angle interface (I/F) section 41 for transmitting the detection signal from the take-up position detection section 25 to the control device 26. The rotation angle interface section 41 is connected to the rotation angle interface section 33 within the block 30 and transmits the detection signal from the take-up position detection section 25 to the block 30. The aforementioned retractor 16 is provided on each of the driver seat, front passenger seat, etc.

At an input side of the block 30, there are further provided an ACC (Adaptive Cruise Control) unit (i.e., unit for controlling an obstacle detection device etc.) 42, VSA (Vehicle Stability Assist) unit (i.e., vehicle behavior stability control unit) 43, FI/AT (Fuel Injection/Automatic Transmission) unit 44, SRS (Supplementary Restraint System) unit 45, vehicle travel state detection unit including a vehicle velocity sensor, etc. Respective output signals of the ACC unit 42, VSA unit 43, FI/AT unit 44, etc. are supplied, via an in-vehicle network 46, to the in-vehicle network communication section 32. The SRS unit 45 includes an SRS control section 45a that receives output signals from an R-side buckle 47R and L-side buckle 47L, and a communication section 45b. The R-side buckle 47R corresponds to the above-mentioned driver-seat-side buckle 18, while the L-side buckle 47L is a buckle of the seat belt apparatus provided on the front passenger seat. The respective output signals from the R-side buckle 47R and L-side buckle 47L are detection signals from buckle switches contained in the buckles 47R and 47L. Once the SRS control section 45a receives the output signal from the R-side buckle 47R or L-side buckle 47L, it transmits the received signal to the communication section 32 of the block 30 via the communication section 45b. Further, while the seat belt is not being used properly during travel of the vehicle, the SRS unit 45 gives a warning signal to a warning lamp 48.

At an output side of the block 30, there are provided an R-side motor 51 and L-side motor 52. The R-side motor 51 is a driving motor for the driver-seat-side seat belt apparatus 10 and provided in correspondence with the R-side motor driving control section 35. The R-side motor driving control section 35 controls an amount of power supply from the above-mentioned power supply (+V) 27, on the basis of a control instruction signal given from the control device 26, to thereby supply a driving current to the R-side motor 51. Block 53 represents a grounding section. Further, the L-side motor 52 is a driving motor for the front-passenger-seat-side seat belt apparatus 10 and provided in correspondence with the L-side motor driving control section 36. The L-side motor driving control section 36 controls an amount of power supply from a power supply (+V) 54, on the basis of a control instruction signal given from the control device 26, to thereby supply a driving current to the L-side motor 52. Block 55 represents a grounding section. The grounding sections 53 and 55 are ground terminals forming part of the vehicle body.

Figure 4:
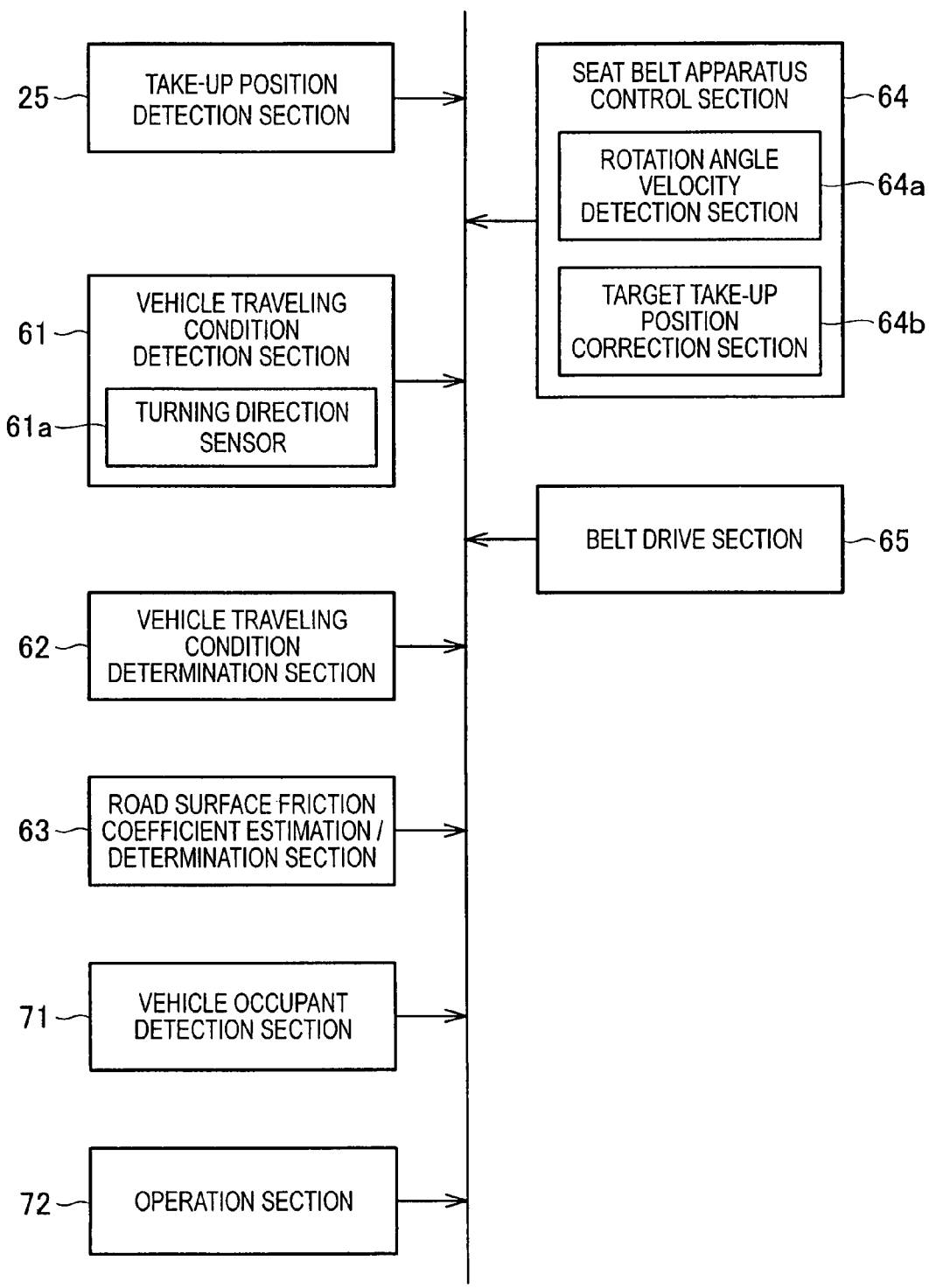
FIG. 4 is a functional block diagram conceptually showing an example setup of primary sections in the control system of FIG. 3.

FIG. 4 is a functional block diagram conceptually showing an example fundamental setup of the control system for the seal belt apparatus 10 according to the instant embodiment. The control system includes, as it primary components, the aforementioned take-up position detection section 25, vehicle traveling condition detection section 61, vehicle traveling condition determination section 62, road surface friction coefficient (μ) estimation/determination section 63, seat belt apparatus control section 64 and belt drive section 65. The control system may also include a vehicle occupant detection section 71 and an operation section 72, as will be later described in detail.

The vehicle traveling condition detection section 61 comprises at least one of various types of conventionally-known sensors, such as a front-rear acceleration sensor for detecting acceleration, in a front-rear direction, of the vehicle, left-right (i.e., lateral) acceleration sensor for detecting acceleration, in a left-right (i.e., lateral) direction), of the vehicle, vehicle velocity sensor, steering angle sensor, road wheel velocity sensor, roll angle sensor, turning angle sensor, inter-vehicular distance sensor, slip angle sensor, brake sensor and accelerator sensor. The vehicle traveling condition detection section 61 has a processing function for performing signal processing or arithmetic processing. Vehicle traveling condition (traveling condition variation), detected by the vehicle traveling condition detection section 61, represents an amount of any of front-rear, left-right and up-down acceleration, slip angle, yaw rate, operation amount, environmental condition (such as an inter-vehicular distance), vehicle velocity, etc. and an amount obtained by arithmetically operating on these acceleration, rate, etc.

The vehicle traveling condition determination section 62 is implemented by an arithmetic operation function of the control device 26, which performs a determination process on a traveling condition of the vehicle by comparing a detection signal from the vehicle traveling condition detection section 61 with a reference value prepared in advance. The vehicle traveling condition determination section 62 can also be constructed to determine emergency levels on the basis of comparisons with respective ones of a plurality of reference values. For example, the determination section 62 may be constructed to determine levels of an inter-vehicular distance, lateral and other acceleration, slip angle, vehicle velocity and operation amounts (such as a brake amount and accelerator amount).

The road surface frictional coefficient (μ) determination section 63, which is implemented by the arithmetic processing function of the control device 26, determines, on the basis of a detection signal from the road wheel velocity sensor, a frictional coefficient (μ) of a road surface on which the vehicle is traveling (i.e., whether the road surface is a high μ road surface or low μ road surface).

The seat belt apparatus control section 64 is implemented by the arithmetic processing function of the control device 26 and the R-side and L-side motor driving control sections 35 and 36. The belt drive section 65 corresponds to the aforementioned retractor 16, more specifically to the R-side and L-side motors 51 and 52.

Figure 5:
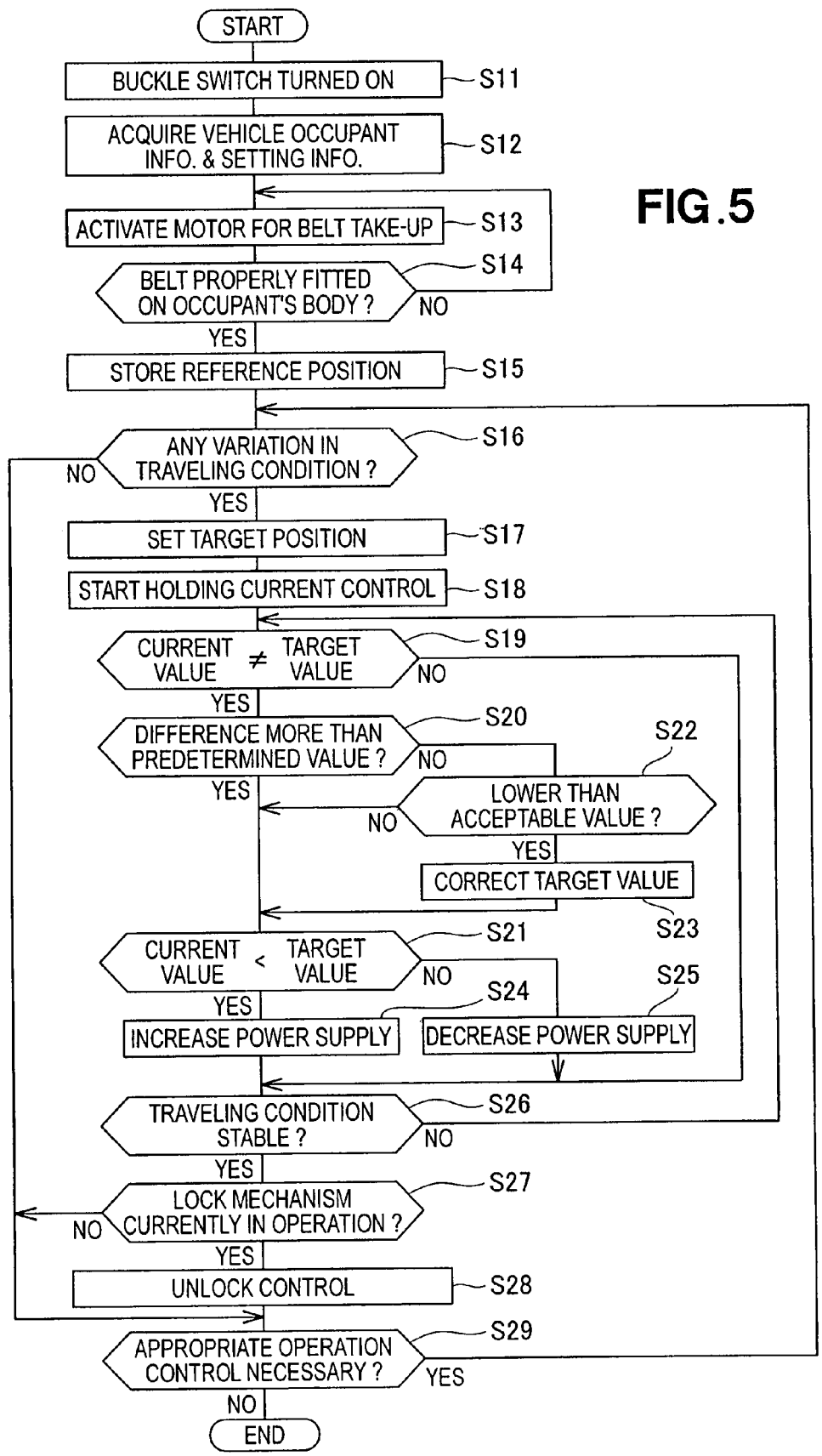
FIG. 5 is a flow chart showing fundamental operational control of the seat belt apparatus.

Now, with reference to a flow chart of FIG. 5, a description will be given about operational control performed on the seat belt apparatus 10 by the seat belt apparatus control section 64 on the basis of the functions of the control system shown in FIG. 4. FIG. 5 shows a flow of control operations after the vehicle occupant 11 is seated in the seat 12, attaches the belt 13 to his or her body and connects the tongue plate 17 to the buckle 18 to turn on the buckle switch 19. The following paragraphs describe the control operations in relation to the R-side motor 51.

The belt 13 is attached to the body of the vehicle occupant 11 as the vehicle occupant 11 is seated in the seat 12, winds the belt 13 around his or her body and connects the tongue plate 17 to the buckle 18 (R-side buckle 47R). Thus, the buckle switch 19 is turned on (step S11).

In the seat belt apparatus 10 whose belt has been attached to the body of the vehicle occupant 11, personal information and setting information of the vehicle occupant 11 is acquired at step S12. Let it be assumed that such personal information and setting information has been stored in advance in the recording section 37 shown in FIG. 3. The personal information of the vehicle occupant 11 (i.e., vehicle occupant information) includes sex information, physical size information, etc., and the setting information includes occupant's favorite information set as desired by the vehicle occupant 11.

Then, the R-side motor 51 is activated, on the basis of the acquired vehicle occupant information and setting information, so that the belt taking-up operation is performed by means of the belt reel 22 (step S13), and the belt taking-up operation is adjusted until the seat belt appropriately fits the occupant's body (step S14). With a YES determination at step S14, a reference position is stored into the above-mentioned recording section at step S15. This "reference position" is indicative of a reference rotational position (i.e., reference take-up position) of the belt reel 22.

Then, a determination is made, as step S16, as to whether any variation has occurred in the vehicle's traveling condition. With a NO determination at step S16, the instant control operation flow is immediately brought to an end, while, with a YES determination at step S16, operations at and after step S17 are performed.

The determination at step S16 is carried out on a periodical basis during the time that the vehicle is traveling and appropriate operation control on the seat belt apparatus 10 is being requested.

The determination at step S16 as to whether any variation has occurred in the vehicle's traveling condition is performed primarily on the basis of detection signals from the vehicle traveling condition detection section 61 and vehicle traveling condition determination section 62, and estimation of the road surface friction coefficient ($\mu$), is performed by the road surface friction coefficient estimation/determination section 63. The determination at step S16 is intended to determine variation in the vehicle's traveling condition, e.g. any of variation, such as relatively great steering operation and accelerator operation, in a normal operating state of the vehicle and variation, such as side slip and sudden deceleration, in an emergent situation. Further, great leftward/rightward shaking of the vehicle occupant may occur in some traveling state, for example, when lateral acceleration has exceeded a predetermined level (but below a critical level range of 0.35-0.45 G at which a lock mechanism is activated), when steering operation exceeding a predetermined operation amount has been performed or when any of the road wheels has run idle during clockwise or counterclockwise turning of the vehicle. Variation in the aforementioned steering operation includes not only one due to operation by the driver but also one due to automatic steering of the vehicle and external force.

When it is determined, at step S16, that "variation has occurred in the vehicle's traveling condition", a target rotational position or target take-up position of the belt reel 22 is set which corresponds to a seat-belt restraining state preset in association with the current variation in the vehicle traveling condition (step S17). Normally, the value of the target take-up position (indicated as "target value" in the figure) is set in such a direction as to increase the vehicle-occupant restraining force of the belt, because variation in the vehicle traveling condition might lead to unstable travel of the vehicle and bring about an emergent situation. Once the target take-up position is set at step S17, a motor holding current is determined for controlling the belt taking-up operation of the R-side motor 51 so as to correspond to the set target take-up position. Then, control on the motor holding current for changing the amount of the belt take-up by the R-side motor 51 is started at next step S18.

The R-side motor 51 is driven with a given power supply (amount), so that the upper belt portion 13a is taken up by the belt reel 22 into the retractor 16. By the given power supply to the R-side motor 51 being retained as a holding current, the belt take-up amount is set to correspond to a desired target take-up position.

More specifically, control on the holding current for setting the belt reel 22 at the target take-up position is continued until a "current value", varying in response to the holding current (that is an object of the control here), agrees with the target value in a stable state, at steps S19-S26 of FIG. 5.

The above-mentioned "current value" corresponds to a current rotational position or take-up position of the belt reel 22, and the "current value" can be detected on the basis of the detection signal output from the take-up position detection section 25. At step S19, a determination is made as to whether the current value and the value of the target take-up position ("target value") are not in agreement with each other, i.e. whether a difference between the current value and the value of the target take-up position ("target value") is not zero. Prior to the determination at step S19 are performed a step of detecting an actual current rotational position of the belt reel 22 and a step of calculating the difference between the current value and the target value. After that, power supply (amount) to the R-side motor 51 is determined such that the difference the current value and the target value becomes zero or approaches zero.

If the current value and target value are not in agreement with each other, i.e. if the difference (deviation) between the current value and the target value is not zero, as determined at step S19, a further determination is made, at step S20, as to whether the difference between the current value and the target value is greater than a predetermined value. If answered in the affirmative at step S20, the flow goes to step S21, while, if answered in the negative at step S20, a further determination is made, at step S22, as to whether a correction amount up to that time point is lower than a predetermined acceptable value. If the correction amount is greater than the acceptable value (NO determination at step S22), the flow goes to step S21. If the correction amount is lower than the predetermined acceptable value (YES determination at step S22), the target value is corrected at step S23, after which the flow goes to step S21.

At step S21, it is determined which one of the current value and target value is greater than the other. If the current value is smaller than the target value, the power supply to the motor is increased at step S24, but, if the current value is greater than the target value, the power supply to the motor is reduced at step S25.

Then, a further determination is made, at step S26, as to whether the vehicle is in a stable traveling condition. With a NO determination at step S26, the flow reverts to step S19 to repeat the operations at and after step S19. While the vehicle is in an unstable traveling condition, control is performed to achieve agreement between the current value and the target value.

If the current value and target value have agreed with each other as determined at step S19, the flow jumps to step S26.

If the vehicle is in a stable traveling condition as determined at step S26, the flow goes to next step S27, where a further determination is made as to whether or not the lock mechanism (not shown) is currently in operation in the retractor 16 of the seat belt apparatus 10. If the lock mechanism is not in operation, the flow directly moves on to step S29, while, if the lock mechanism is in operation, the flow goes to step S29 after unlock control is performed at step S28. Although not particularly shown, the lock mechanism is ordinarily provided in association with the shaft 22a of the belt reel 22.

At step S29, it is determined whether or not the vehicle is currently traveling and appropriate operation control has to be performed on the seat belt apparatus 10. If answered in the affirmative at step S29, the flow reverts to step S16 in order to ascertain whether any variation has occurred in the vehicle's traveling condition, but, if answered in the affirmative at step S29, the operation control on the seat belt apparatus 10 is brought to an end.

In the aforementioned manner, the electric-type pretensioner is constructed using the R-side motor 51, which allows the vehicle occupant 11 to be kept in a proper position and posture.

According to the above-described operation control on the seat belt apparatus 10, the power supply (amount) to the R-side motor 51 is controlled, on the basis of the detection signal output from the take-up position detection section 25 and indicating the current take-up position of the belt reel 22 and the signal output from the vehicle traveling condition detection section 61 and indicating that variation has occurred in the traveling condition of the vehicle, so as to control the driving amount of the motor 51. During that time, control is performed, on the basis of the detection signal output from the take-up position detection section 25, to hold the belt reel 22 at a predetermined take-up position to thereby appropriately hold the vehicle occupant 11 in the seat by means of the belt 13.

The above-mentioned predetermined take-up position of the belt reel 22 is a position where the belt 13 appropriately fits the body of the vehicle occupant 11 without slack, and such a predetermined take-up position is set in the embodiment on the basis of data obtained empirically with sexes, physical sizes, seat positions, etc. taken into account. More preferably, the pre-determined take-up position of the belt reel 22 is a position where the belt 13 softly fits the body of the vehicle occupant 11 in such a manner that the belt tension can promptly increase as the vehicle occupant 11 moves. It is preferable that the belt tension does not increase above an initial tension level (set as the seat belt was attached to the body of the vehicle occupant prior to the start of travel of the vehicle) unless a change occurs in the posture of the vehicle occupant 11.

Regarding normal take-up positions, a "reference position" is set per vehicle occupant. As explained above in relation to step S15, the reference positions corresponding to vehicle occupants are stored in advance in the control system of the seat belt apparatus 10. Such a reference position may be set by the retractor 16 first taking up the belt, in response to detection of connection of the belt to the buckle 18, until the belt fits the body of the vehicle occupant 11, then taking up the belt to a target take-up position on the basis of prestored data and terminating the taking-up operation with the belt stopped at the target take-up position; alternatively, the belt taking-up by the retractor 16 may be terminated once it is detected, during the belt taking-up operation, that resistance to the belt taking-up has exceeded a predetermined level to make the belt taking-up difficult to continue. At an initial stage immediately after attachment to the vehicle occupant of the seat belt, the reference position and the target or predetermined take-up position) equal each other; however, the target take-up position will vary, in response to variation in the vehicle traveling condition etc., while the belt is holding the vehicle occupant in the seat.

During the time that the belt 13 is holding the vehicle occupant 11 in the seat, a positional shift or movement may occur in the vehicle occupant 11 due to some reason so that the take-up position detection section 25 detects rotation, in the belt paying-out direction, of the belt reel 22. In such a case, the seat belt apparatus control section 64 receives the detection signal from the take-up position detection section 25, on the basis of which the control section 64 performs drive control to increase the power supply to the R-side motor 51. Thus, the supporting force with which the belt 13 holds the vehicle occupant 11 while assisting in a posture change of the vehicle occupant with only a limited range can be increased, so that an undesired posture change of the vehicle occupant 11 can be effectively limited or prevented. Because the belt tension applied to the vehicle occupant 11 increases as a positional shift or movement of the vehicle occupant 11 increases, the belt 13 can keep the vehicle occupant 11 in a proper posture.

Further, once the take-up position detection section 25 detects rotation, in the belt taking-up direction, of the belt reel 22 during the vehicle-occupant holding operation by the belt 13, the seat belt apparatus control section 64 performs drive control to decrease the power supply to the R-side motor 51.

The take-up position detection section 25 has a sensor function for detecting the rotation angle of the belt reel 22. Thus, on the basis of the detection signal, indicative of the rotation angle of the belt reel 22, supplied from the take-up position detection section 25, the seat belt apparatus control section 64 can use the arithmetic processing function of the control device (CPU) 26, which constitutes the control section 64, to provide a rotation angle velocity detection section 64a that detects a variation rate of the rotation angle of the belt reel 22. The seat belt apparatus control section 64 performs the drive control to vary the increase/decrease amount of the power supply to the R-side motor 51, in accordance with the rotation angle velocity of the belt reel 22 detected by the rotation angle velocity detection section 64a when variation has occurred in the rotation angle of the belt reel 22 while the belt 13 is holding the vehicle occupant 11. By thus varying responsiveness of the power supply to the R-side motor 51 in accordance with variation rate of the rotation angle of the belt reel 22, the amount of power supply to the R-side motor 51 can be controlled so as to, for example, quickly respond to quick paying-out of the belt 13 and slowly respond to slow paying-out of the belt 13.

Figure 6A:
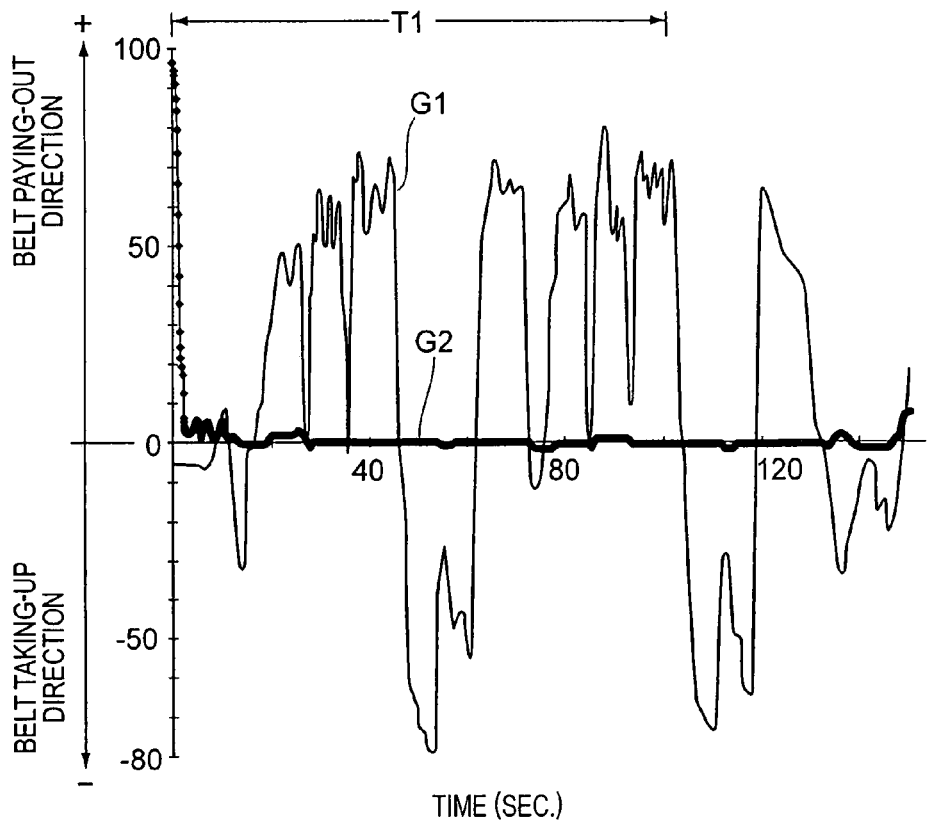
FIG. 6A is a waveform diagram explanatory of an example of operational control performed in the seal belt apparatus according to the embodiment.

The following lines describe an example of control for keeping constant the restraining force of the belt 13 when the lateral acceleration is fluctuating. In this case, the amount of power supply to the R-side motor 51 is varied in accordance with the fluctuation of the lateral acceleration. Control flow to be used for performing this restraining force control is the same as the flow chart of FIG. 5. Example details of the restraining force control based on the control flow will be explained with reference to FIGS. 6A and 6B. FIG. 6A is a waveform diagram explanatory of the restraining force control performed in the instant embodiment on the basis of the control flow of FIG. 5, while FIG. 6B is a waveform diagram explanatory of a conventionally-known control technique designed to maintain a predetermined amount of power supply (and hence predetermined belt tension).

Figure 6B:
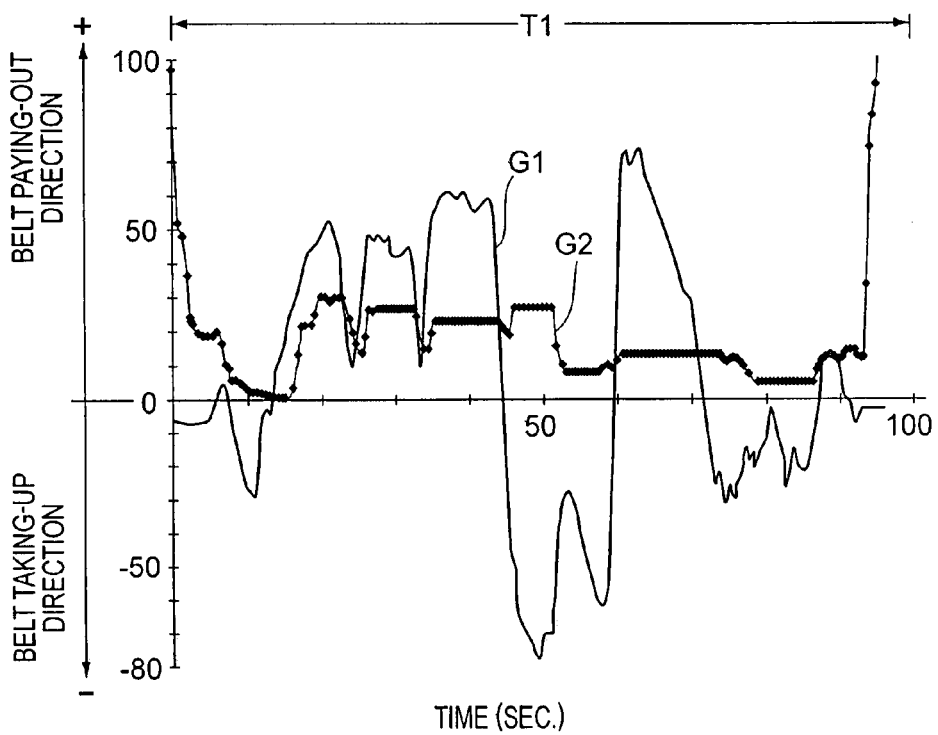
FIG. 6B is a waveform diagram explanatory of a conventionally-known control technique.

In each of the diagrams of FIGS. 6A and 6B, the horizontal axis represents time (second), while the vertical axis represents the paying-out direction (+) and taking-up direction (−) of the seat belt 13. In the figures, a time section T1 on the horizontal axis has a length of 100 sec., G1 represents a variation characteristic curve of the lateral acceleration, and G2 represents a variation characteristic curve of the take-up position. In the variation characteristic curve G2 of the take-up position, there is indicated a rotation angle measured (i.e., number of pulses counted) from a time point when an ignition switch was turned on.

According to the restraining force control performed in the instant embodiment, the take-up position is not varied greatly in response to frequent, great fluctuation (variation characteristic G1) of the lateral acceleration; namely, the belt reel 22 is held at stable, substantially constant take-up positions with fluctuation of the take-up position limited. According to the conventional control, on the other hand, the value of the take-up position is varied greatly in response to frequent fluctuation, so that the vehicle-occupant restraining operation of the belt tends to be unstable. Therefore, with the conventional control technique, the belt would slacken if the belt tension (amount of power supply to the motor) is set to a low level, and the belt take-up would become excessive if the belt tension is set to a high level.

Further, a turning direction sensor 61a for detecting a turning direction of the vehicle is included in the aforementioned vehicle traveling condition detection section 61. Once it is detected, on the basis of the detection signal from the turning direction sensor 61a, that the turning direction of the vehicle has varied (e.g., from rightward to leftward or from leftward to rightward) during the vehicle-occupant holding operation by the belt 13, the seat belt apparatus control section 64 can perform the drive control, in accordance with the detection signal from the turning direction sensor 61a, to vary the predetermined take-up position and/or the increase/decrease amount of the power supply to the motor during the vehicle-occupant holding operation. For example, in the commonly-known three-point supporting seat belt apparatus attached to a vehicle occupant in a "cross-coupled" fashion from an outer edge portion of the vehicle body toward a middle interior of the vehicle compartment, a supporting force that limits inward movement (i.e., movement toward the middle interior of the vehicle compartment) of the vehicle occupant would become slightly smaller than a supporting force that limits outward movement of the vehicle occupant. Thus, in the case of the seat belt apparatus 10 employed for the driver seat (of a right-hand-drive vehicle), the take-up position for clockwise (i.e., right) turning is set greater in value than the take-up position for counterclockwise (left) turning. In an alternative, the increase/decrease amount of the power supply to the motor may be varied to increase the responsiveness and inhibit the paying-out of the belt 13. In the case of the seat belt apparatus 10 employed for the front passenger seat, control similar to the above-mentioned may be performed at the time of counterclockwise turning of the vehicle.

Figure 7:
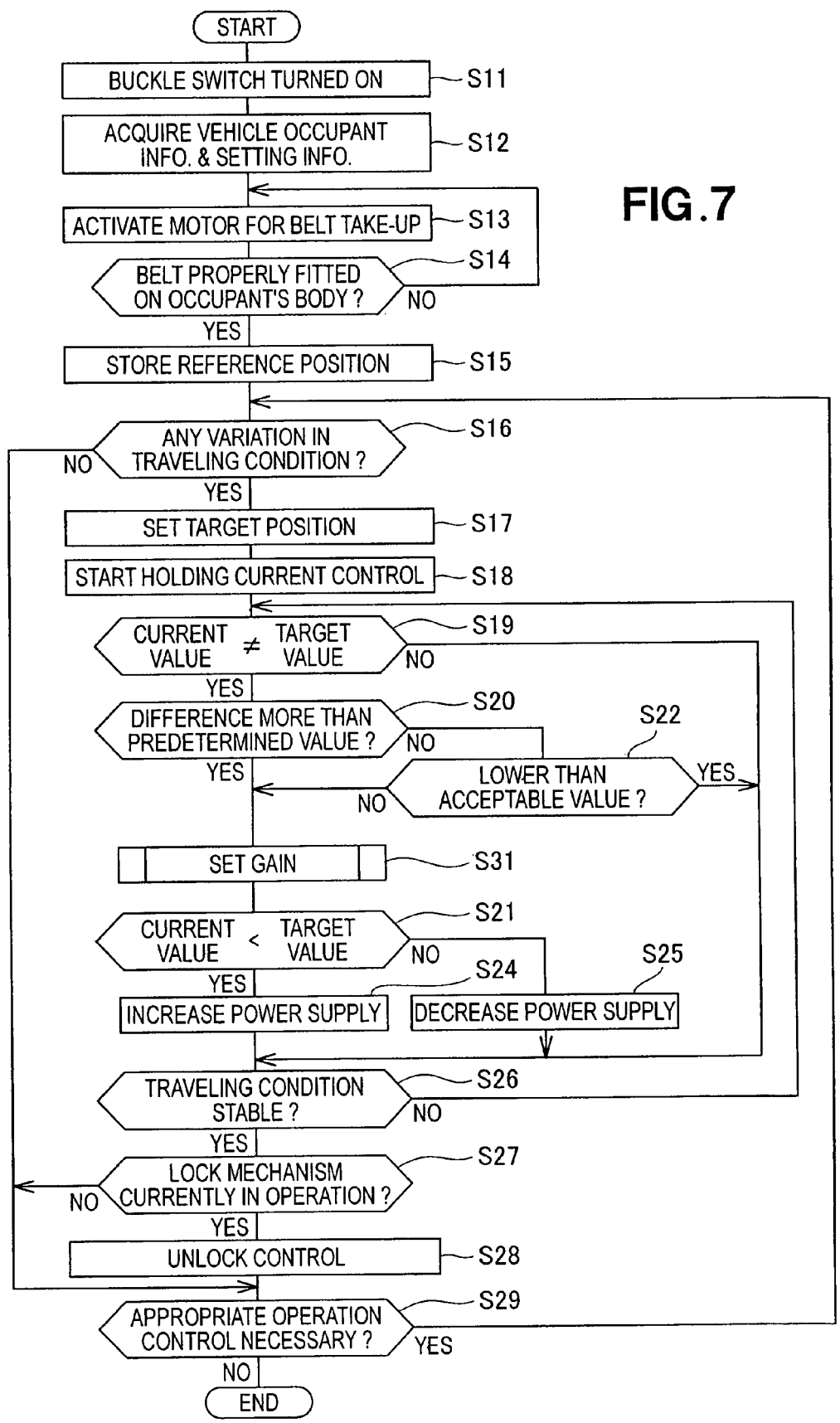
FIG. 7 is a flow chart showing another example of the operation control performed on the seat belt apparatus.

Examples of such control will be described in greater detail with reference to FIGS. 7-9. FIG. 7 is a flow chart showing the aforementioned example of the operation control performed on the seat belt apparatus according to the instant embodiment, where steps directed to substantially the same operations as in FIG. 5 are indicated by the same reference numerals and will not be described in detail here to avoid unnecessary duplication.

The control flow of FIG. 7 is different from the control flow of FIG. 5 in that it does not include step S23 of FIG. 5, the flow goes from step S22 to step S26 upon a YES determination at step S22 and step S31 is added between steps S20 and S21. Step S31 preceding step S21 is directed to a routine for variably setting a predetermined gain. This predetermined gain corresponds to an increase/decrease amount of the power supply to be used at subsequent steps S24 and S25 that are directed to increasing/decreasing the amount of power supply to the motor.

According to the control flow of FIG. 7, the provision of such step S31 can optimally vary the amount of the power supply to the motor on the basis of the set gain when the vehicle traveling condition has satisfied a predetermined condition. If the gain is set to a great value, a variation amount of the power supply to the motor increases greatly at step S24 or S25, so that the driving amount per predetermined unit time of the motor increases. In this way, it is possible to adjust the responsiveness of the motor relative to variation in the payout amount of the belt 13.

Figure 8:
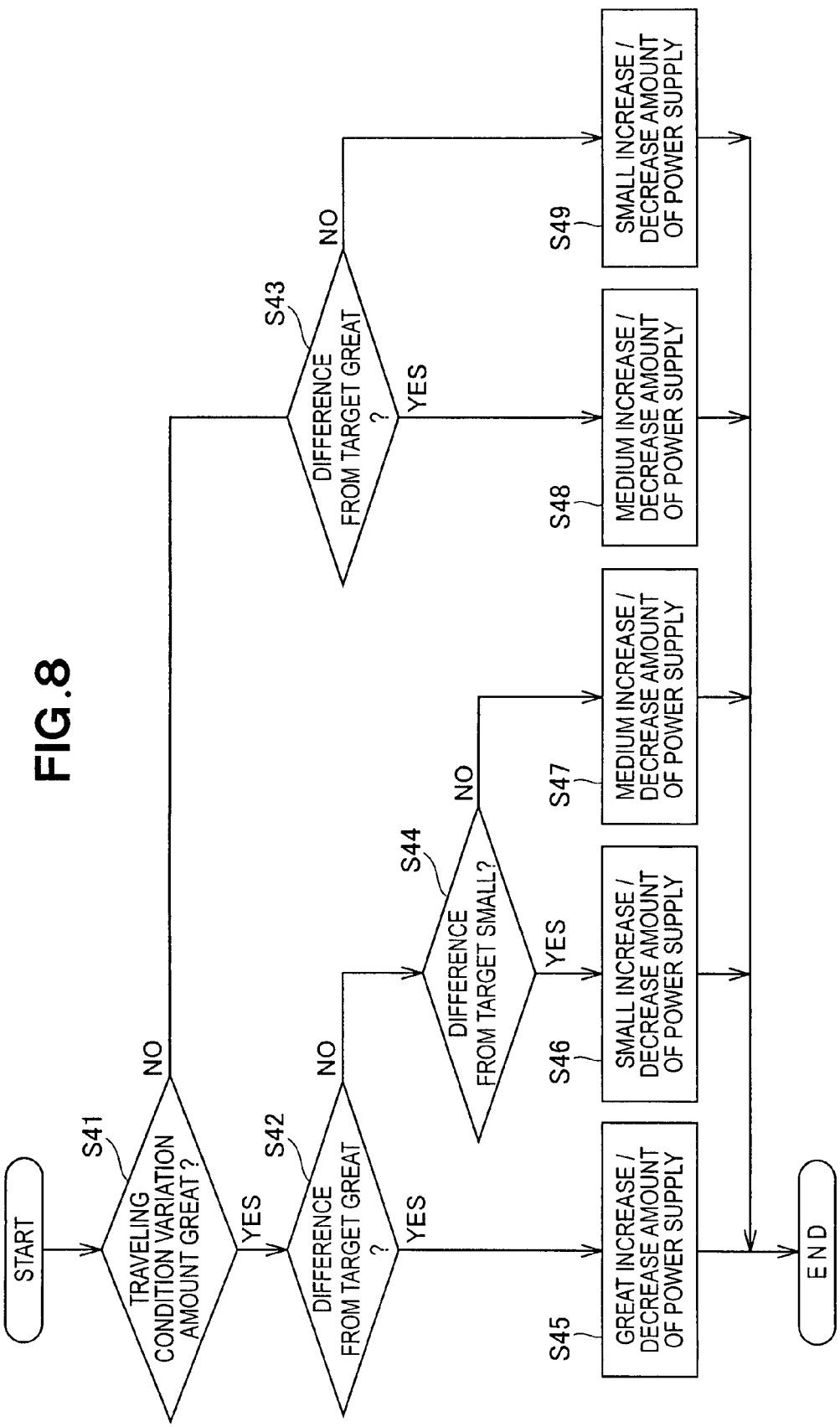
FIG. 8 is a flow chart showing a first example of a detailed operational sequence of a routine step included in the flow chart of FIG. 7.

FIG. 8 is a flow chart showing a first example of a detailed operational sequence of step S31. At step S41, rough increase/decrease amounts (i.e., variation amounts) of the power supply to the motor (i.e., gains of the motor) are allocated in accordance with amounts of variation in the vehicle traveling condition. At subsequent steps S42, S43 and S44, more specific values of the increase/decrease amount of the power supply to the motor are allocated in accordance with differences (or deviations) from a value of the target take-up position. As a consequence, great, medium and small values of the increase/decrease amount of the power supply to the motor are determined ultimately at five steps. Namely, a great value of the increase/decrease amount of the power supply is determined at step S45 if the variation amount of the traveling condition is great and the difference from the target value is great, a small value of the increase/decrease amount of the power supply is determined at step S46 if the variation amount of the traveling condition is great and the difference from the target value is small, a medium value of the increase/decrease amount of the power supply is determined at step S47 if the variation amount of the traveling condition is great and the difference from the target value is neither great nor small, a medium value of the increase/decrease amount of the power supply is determined at step S48 if the variation amount of the traveling condition is not great and the difference from the target value is great, and a small value of the increase/decrease amount of the power supply is determined at step S49 if the variation amount of the traveling condition is not great and the difference from the target value is not great either.

At step S41, any other suitable determining criterion, such as the physical size of the vehicle occupant, may be used instead of the variation amount of the traveling condition. Further, at steps S42-S44, a "variation velocity of the take-up position" may be used as the determining criterion instead of the difference (deviation) from the target value.

Figure 9:
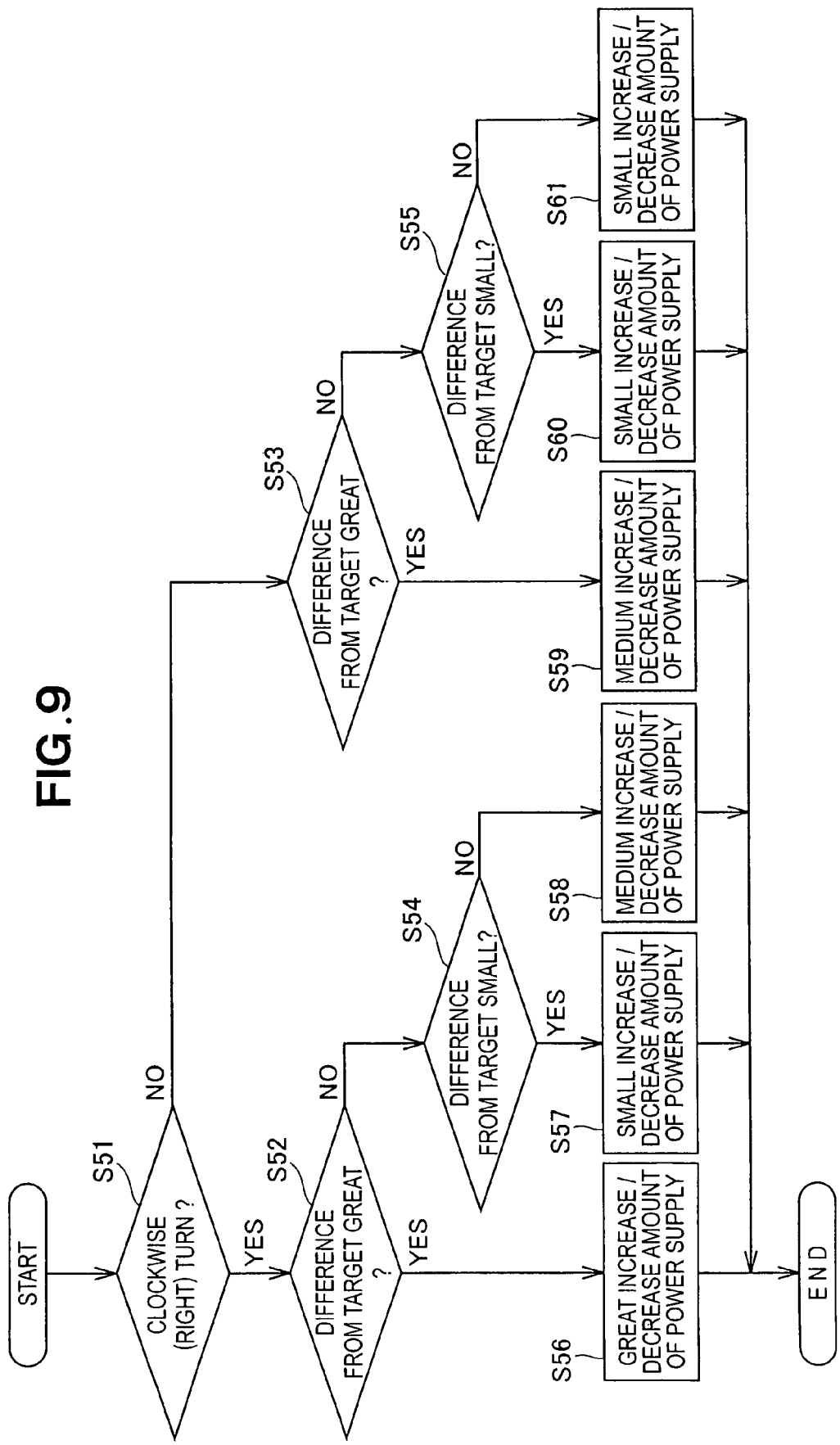
FIG. 9 is a flow chart showing a second example of the detailed operational sequence of the routine step included in the flow chart of FIG. 7.

FIG. 9 is a flow chart showing a second example of the detailed operational sequence of step S31. Whereas the second example is discussed here in relation to a case where the vehicle has made a clockwise (or right) turn during belt taking-up control of the seat belt apparatus for the driver seat. Such an operational sequence of FIG. 9 is applicable to the seat belt apparatus for the front passenger seat when the vehicle has made leftward turning, because the three-point supporting seat belt apparatus for the driver seat and front passenger seat are disposed in horizontal symmetrical relation to each other.

First, at step S51, a determination is made as to whether the vehicle has made a clockwise (or right) turn, and rough increase/decrease amounts of the power supply to the motor (i.e., gain of the motor) are allocated depending on whether the turn made is a clockwise (or right) turn or not. At subsequent steps S52, S53, S54 and S55, more specific values of the increase/decrease amount of the power supply to the motor are allocated in accordance with differences (deviations) from a target value. As a consequence, great, medium and small values of the increase/decrease amount of the power supply to the motor are determined ultimately at six steps. Namely, a great value of the increase/decrease amount of the power supply is determined at step S56 if the turn made is a clockwise turn and the difference from the target value is great, a small value of the increase/decrease amount of the power supply is determined at step S57 if the turn made is a clockwise turn and the difference from the target value is small, a medium value of the increase/decrease amount of the power supply is determined at step 58 if the turn made is a clockwise turn and the difference from the target value is neither great nor small, a medium value of the increase/decrease amount of the power supply is determined at step S59 if the turn made is not a clockwise turn and the difference from the target value is great, a small value of the increase/decrease amount of the power supply is determined at step S60 if the turn made is not a clockwise turn and the difference from the target value is small, and a small value of the increase/decrease amount of the power supply is determined at step S61 if the turn made is not a clockwise turn and the difference from the target value is neither great nor small.

Figure 10:
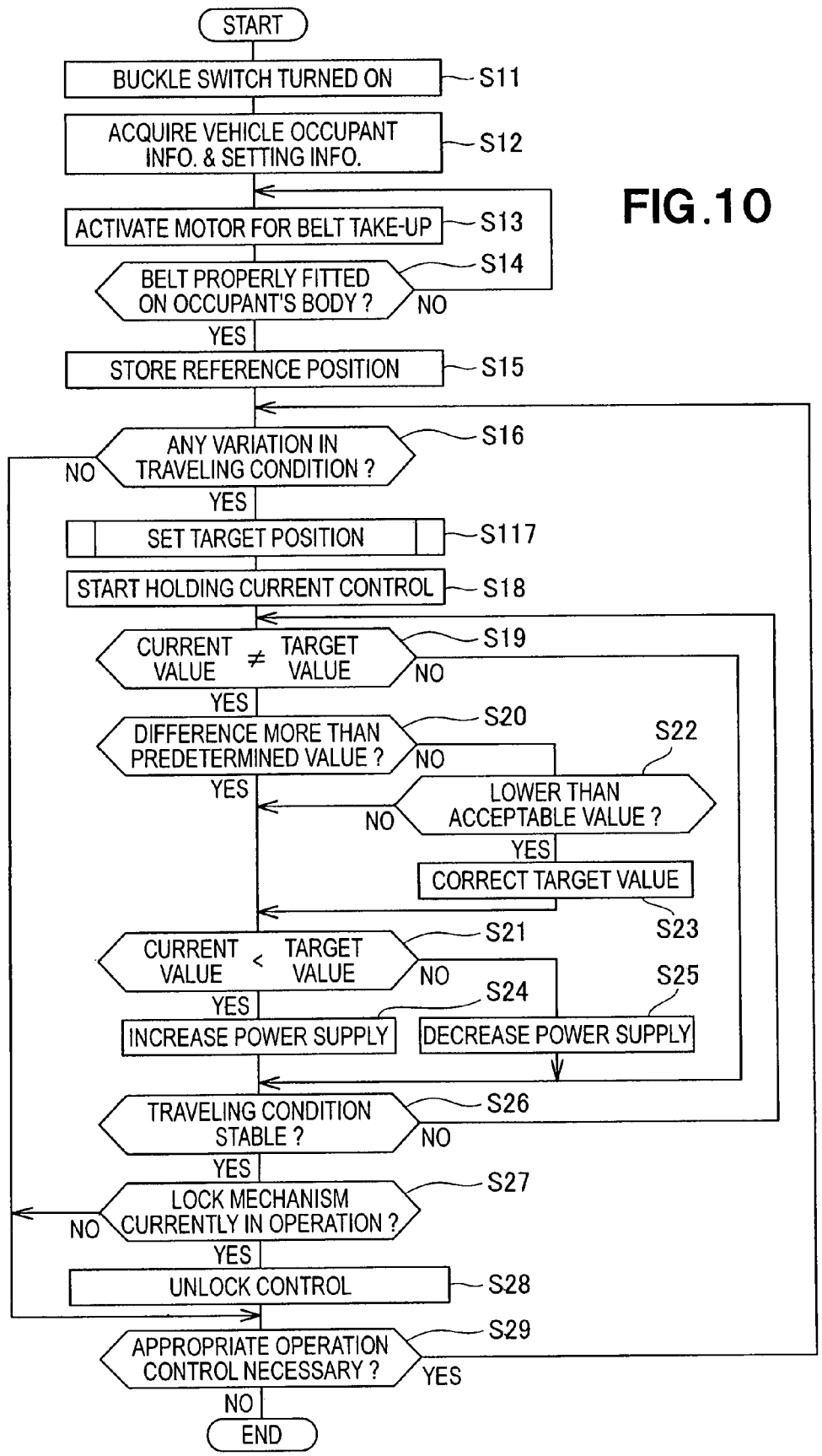
FIG. 10 is a flow chart showing still another example of the operation control performed on the seat belt apparatus.
Figure 11:
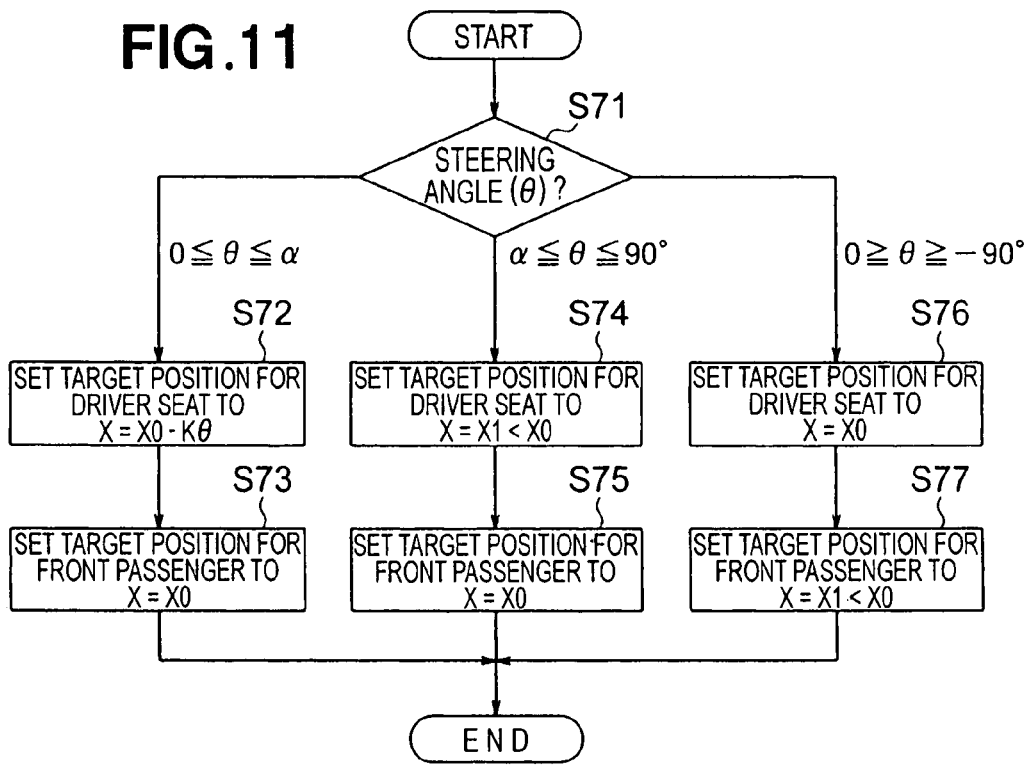
FIG. 11 is a flow chart showing an example of a detailed operational sequence of a routine step included in the flow chart of FIG. 10.
Figure 12:
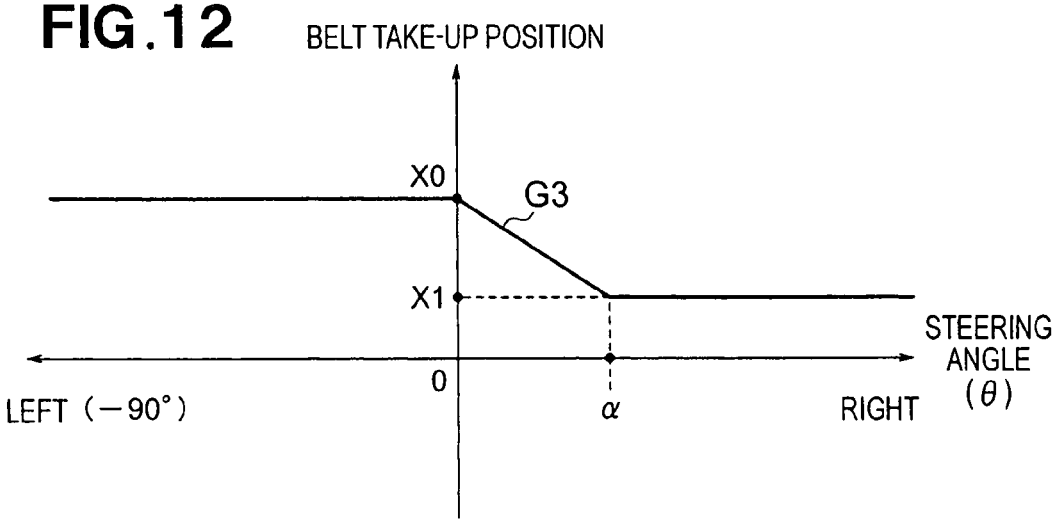
FIG. 12 is a graph showing a variation characteristic of a belt pay-out position relative to a steering angle θ.

With reference to FIGS. 10-12, the following paragraphs describe still another example of the operation control performed on the seat belt apparatus 10 by the seat belt control section 64. This example is characterized by inclusion of a "target take-up position setting" routine for variably setting a "target take-up position".

FIG. 10 is a flow chart showing the other example of the operation control performed on the seat belt apparatus 10 according to the instant embodiment, where steps directed to substantially the same operations as in FIG. 5 are indicated by the same reference numerals and will not be described in detail here to avoid unnecessary duplication.

The control flow of FIG. 10 is different from the control flow of FIG. 5 in that step S17 provided between step S16 and step S18 in FIG. 5 is replaced with step S117 directed to performing a routine process for variably setting a predetermined "target take-up position". Step S117 can vary the predetermined target take-up position in accordance with a specific condition to thereby set an appropriate target take-up position. According to the control flow of FIG. 10, the provision of such routine step S117 can optimally vary the target take-up position in accordance with a specific condition.

FIG. 11 is a flow chart showing an example of a detailed operational sequence of routine step S117. At first step S71, a range of the currently-detected steering angle θ is identified. In the instant example, three ranges of the steering angle θ, i.e. $0 \leq \theta \leq \alpha$, $0 \leq \theta \leq 90°$ and $0 \geq \theta \geq -90°$, are set in advance. More specifically, $0 \leq \theta \leq \alpha$ is a range preset in correspondence with rightward (clockwise) steering operation, and $0 \geq \theta \geq -90°$ is a range preset in correspondence with leftward (counterclockwise) steering operation. At step S71, a determination is made as to which one of the abovementioned three ranges the currently-detected steering angle θ is included in. "α" represents a given steering angle θ that occurs when rightward steering operation has been performed by the driver, as illustrated in FIG. 12. In FIG. 12, the horizontal axis represents the steering angle θ while the vertical axis represents the take-up position, and G3 represents a control target take-up position curve of the seat belt apparatus for the driver seat. In FIG. 12, target take-up positions "X0" and "X1" are indicated in the control target take-up position curve G3.

If the detected steering angle θ satisfies the condition of $0 \leq \theta \leq \alpha$, the control target take-up position (X) of the seat belt apparatus for the driver seat is set to "X=X0−Kθ" at step S72 of FIG. 11, where X0 represents a reference value and K is a constant. The control target take-up position (X) of the seat belt apparatus for the front passenger seat is set to "X=X0" at step S73.

If the detected steering angle θ satisfies the condition of $0 \leq \theta \leq 90°$, the control target take-up position (X) of the seat belt apparatus for the driver seat is set to "X=X1<X0" at step S74, where X1 represents a given value greater than the reference value X0. The control target take-up position (X) of the seat belt apparatus for the front passenger seat is set to "X=X0" at step S75.

If the detected steering angle θ satisfies the condition of $0 \geq \theta \geq -90°$, the control target take-up position (X) of the seat belt apparatus for the driver seat is set to "X=X0" at step S76. The control target take-up position (X) of the seat belt apparatus for the front passenger seat is set to "X=X1<X0" at step S77.

The instant embodiment has been described above as setting the target take-up position in accordance with the detected steering angle θ as an amount of the traveling condition. Alternatively, the embodiment may be arranged to set the target take-up position, in a manner similar to the aforementioned, in accordance with any other amount or value of the vehicle traveling condition, such as deceleration, lateral acceleration or yaw rate that may easily induce a positional shift of the vehicle occupant. Namely, in a case where the vehicle traveling condition tends to vary while the vehicle occupant is being held by the belt, the embodiment may be constructed to re-set the target take-up position in accordance with the varying traveling condition.

The above-mentioned SRS (Supplementary Restraint System) unit 45 includes a vehicle occupant detection section for detecting the vehicle occupant 11. Thus, a vehicle occupant detection section 71 may be provided at the input side of the control system, as illustrated in FIG. 4. With such a vehicle occupant detection section 71, it is possible to obtain information indicative of the sex, physical size, etc. of the vehicle occupant 11 seated in the seat 12. Therefore, the seat belt apparatus control section 64 may be arranged to vary, on the basis of vehicle occupant information detected by the vehicle occupant detection section 71, the predetermined take-up position of the belt reel 22 and/or increase/decrease amount of the power supply to the motor during the vehicle-occupant holding operation. For example, it is preferable that the target take-up position be set to a greater value than the normal target take-up position, or higher responsiveness of the motor be set, for a vehicle occupant of a greater physical size.

As a modification, the vehicle-occupant holding force of the belt may be properly controlled using a road surface friction coefficient detection means implemented by the road surface friction coefficient (μ) estimation/determination section 63. On the basis of information related to the road surface friction coefficient (μ) detected by the road surface friction coefficient estimation/determination section 63, the seat belt apparatus control section 64 determines, for example, whether the vehicle is currently in an oversteered state or understeered state, and it sets the take-up position of the belt reel 22 to a smaller value or sets the increase/decrease amount of the power supply to the R-side motor 51 during the vehicle-occupant restraining operation to a smaller value in response to a smaller value of the road surface friction coefficient (μ). For example, if the road surface friction coefficient (μ) is small, a small friction force acts on the vehicle body via the road wheels during a traveling direction change or acceleration of the vehicle, so that small variation occurs in the posture of the vehicle occupant relative to the vehicle body; consequently, by decreasing the vehicle-occupant holding force of the belt 13, it is possible to prevent excessive restraint of the vehicle occupant and thereby achieve an enhanced comfort of the vehicle occupant.

Further, the seat belt apparatus control section 64 may also be arranged to perform control to inhibit increase of the power supply to the motor responsive to variation of the predetermined take-up position of the belt reel 22 during the vehicle-occupant holding operation by the seat belt apparatus 10. Furthermore, the seat belt apparatus control section 64 may include a target take-up position correction section 64b that increases/decreases the predetermined take-up position of the belt reel 22 to re-set a new target take-up position. Thus, the seat belt apparatus control section 64 can effectively control or limit variation in the posture of the vehicle occupant by preventing the vehicle-occupant holding force from increasing more than necessary in a case where variation in the posture gradually decreases and by increasing the vehicle-occupant holding force as necessary in a case where relatively great variation in the posture occurs.

Next, with reference to FIGS. 13-15, a description will be given about still another example of the operation control performed on the seat belt apparatus 10 by the seat belt apparatus control section 64.

Figure 13:
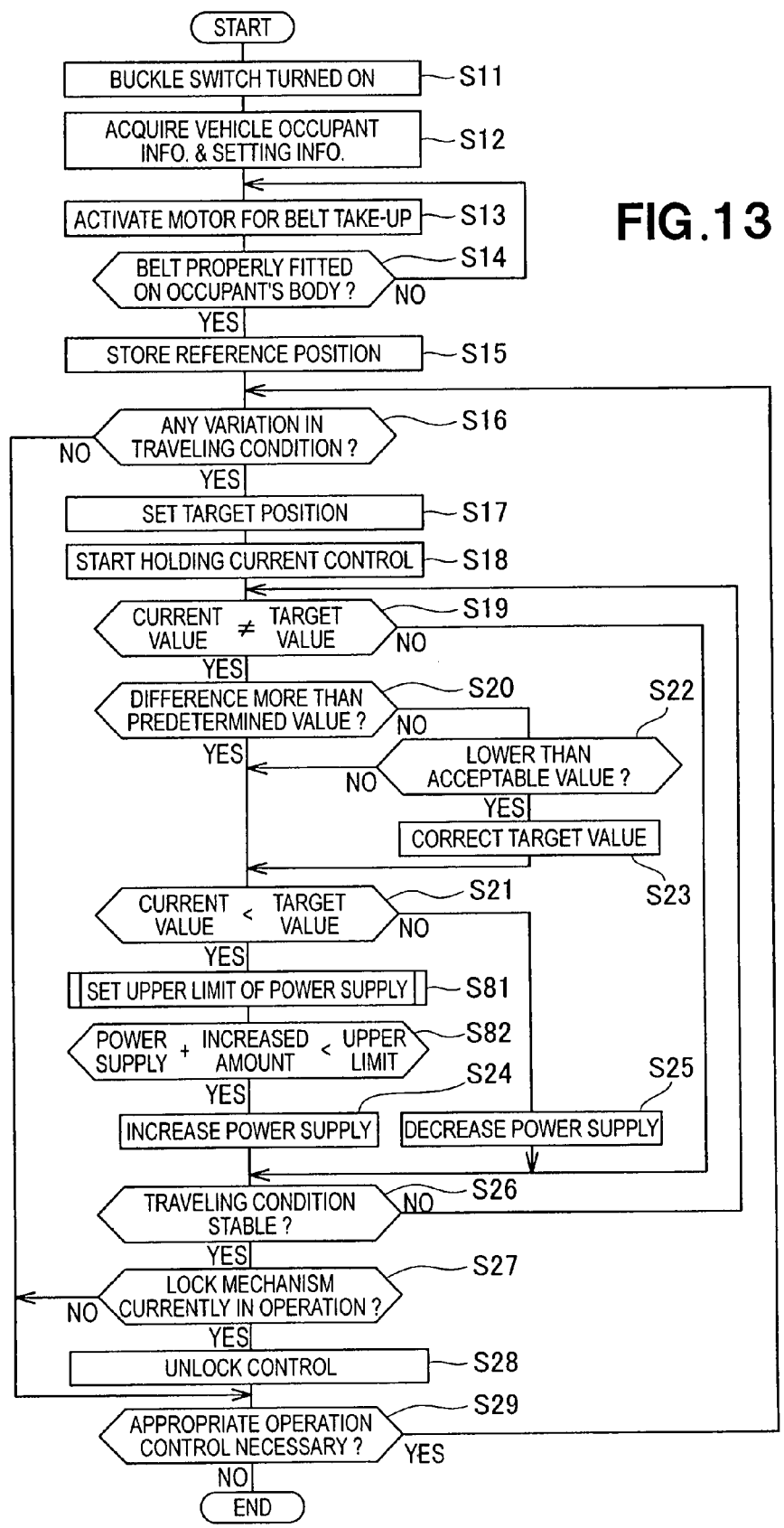
FIG. 13 is a flow chart showing still another example of the operation control performed on the seat belt apparatus.

FIG. 13 is a flow chart showing still another example of the operation control performed on the seat belt apparatus 10, where steps directed to substantially the same operations as in FIG. 5 are indicated by the same reference numerals and will not be described in detail here to avoid unnecessary duplication. This example is characterized by inclusion, between step S21 and step S24 of FIG. 5, of steps S81 and S82 for performing a "power-supply upper limit setting" routine.

If the current value is smaller than the target take-up position as determined at step S21, the power supply to the motor is increased at step S24. Prior to execution of the power supply increase at step S24, the "power-supply upper limit setting" routine is performed at step S81 to set an upper limit of the power supply to the motor (i.e., upper limit of an electric current to be supplied to the motor). Details of step S81 are shown in FIG. 14. Once the upper limit of the power supply to the motor is set, the value of the upper limit of the power supply is used at step S82.

The reason why the "power-supply upper limit setting" routine is performed is that this example of the operation control employs a scheme of "defining an amount of the power supply" as one way of defining a take-up velocity of the seat belt. After completion of the "power-supply upper limit setting" routine at step S81, a determination is made, at step S82, as to whether or not a total current value, obtained by adding the current power supply to the motor and variation amount (increased amount) of the power supply, is smaller than the newly-set upper limit. With a YES determination at step S82, the power supply is increased by an appropriate amount at step S24. With a NO determination at step S82, on the other hand, the flow moves on to step S26. By the provision of such step S82, the motor is kept in the neighborhood of the set upper limit of the power supply so that the belt take-up velocity can be kept below a predetermined velocity, even in a case where there is a positional deviation from the target take-up position; namely, a maximum value of the belt take-up velocity can be defined. The other operations in the control flow of FIG. 13 are similar to those of FIG. 5.

Figure 14:
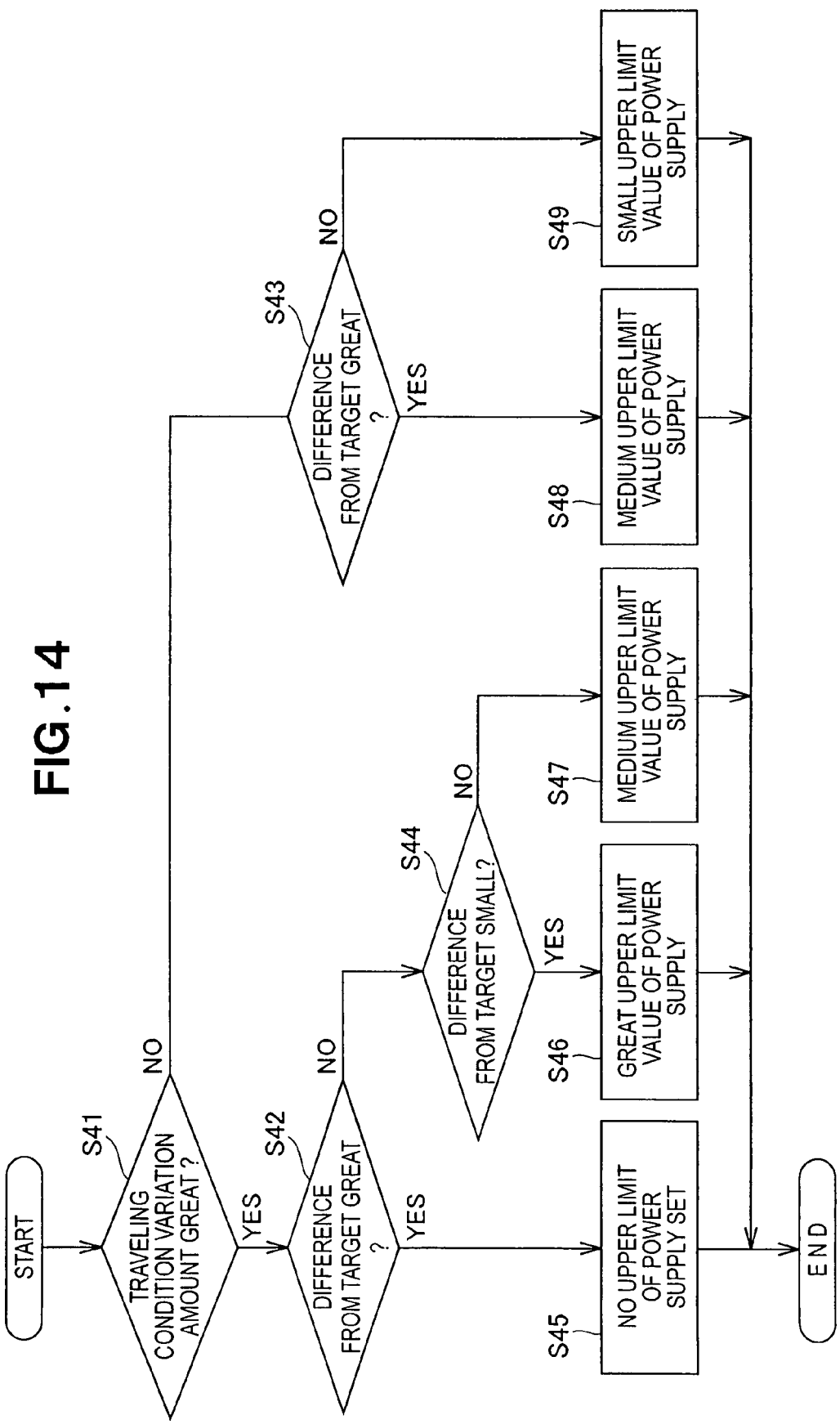
FIG. 14 is a flow chart showing an example of a detailed operational sequence of a routine step included in the flow chart of FIG. 13.

FIG. 14 is a flow chart showing a detailed operational sequence of step S81. First, at step S91, rough ranges of the upper limit of the power supply are allocated in accordance with amounts of variation in the vehicle traveling condition. At subsequent steps S92, S93 and S94, more specific ranges of the upper limit of the power supply are allocated in accordance with differences (deviations) from a target value. As a consequence, ranges of the upper limit of the power supply are set at five steps. Namely, no upper limit of the power supply is set if the amount of variation in the vehicle traveling condition is great and the difference from the target value is great (step S95), a great upper limit value of the power supply is set if the amount of variation in the vehicle traveling condition is great and the difference from the target value is small (step S96), a medium upper limit value of the power supply is set if the amount of variation in the vehicle traveling condition is great and the difference from the target value is neither great nor small (step S97), a medium upper limit value of the power supply is set if the amount of variation in the vehicle traveling condition is not great and the difference from the target value is great (step S98), and a small upper limit value of the power supply is set if the amount of variation in the vehicle traveling condition is not great and the difference from the target value is not great (step S99).

In the example of FIG. 14, the reference range may be determined at step S91 using, as the determining criterion, the physical size of the vehicle occupant or the like instead of the amount of variation in the vehicle traveling condition. Further, the determinations at steps S92-S94 may be made using the take-up velocity.

FIG. 15 is a graph showing results of the control illustrated in FIGS. 13 and 14, where the horizontal axis represents time (second) while the vertical axis represents the belt pay-out amount (i.e., amount in the "+" direction). In the graph of FIG. 15, G4 represents a variation characteristic curve of results of the control performed in the case where steps S81 and S82 were added, and G5 represents a variation characteristic curve of results of the control performed in the case where steps S81 and S82 were not added. Time point t1 is when slack of the belt 13 holding the vehicle occupant has been removed during the control of the seat belt take-up operation. In the graph, a region to the left of the time point t1 is where there is no load applied, while a region to the right of the time point t1 is where there is a load applied. In the variation characteristic curve G5, the belt pay-out amount varies at high velocity until the time point t1 is reached, creating a relatively great inflection point P1. In the variation characteristic curve G4, on the other hand, the belt pay-out amount varies at moderate velocity until the time point t1 is reached, creating a relatively small inflection point P2; thus, it is possible to reduce a feeling of suddenness that would be produced in the vehicle-occupant holding operation by the belt.

The aforementioned ACC (Adaptive Cruise Control) unit 42 includes an operation section operable by the vehicle occupant 11 to select a position at which the vehicle occupant 11 is to be held by the belt (i.e., belt's holding or restraining position). This operation section is in the form of an operation switch, which allows the belt's restraining position to be changed or selected as desired by the vehicle occupant 11. This operation section may be provided at the input side of the control system as indicated at 72 in FIG. 4.

With the operation section 72, it is possible to change, as desired, the take-up position of the belt reel 22 and/or increase/decrease amount of the power supply to the motor during the vehicle-occupant holding operation. More specifically, if the rotation angle of the belt reel 22 is set to a greater angle value in the belt paying-out position (Light mode), not only the vehicle occupant can be caused to feel that the operating frequency of the belt reel 22 has decreased, but also the vehicle-occupant restraining force at the beginning of the holding operation can be reduced. Further, if the rotation angle of the belt reel 22 is set to a greater angle value in the belt taking-up direction (Heavy mode), not only the vehicle occupant can be caused to feel that the operating frequency of the belt reel 22 has increased, but also the vehicle-occupant holding force at the beginning of the holding operation can be increased.

Further, if the operation section 72 is used to set how soon the rotation, in the paying-out direction, of the belt reel 22 caused by movement of the vehicle occupant should be terminated, it is possible to set a desired operational feeling.

The operation section 72, which is operable by the vehicle occupant 11 to set desired tension of the belt 13, is provided, for example, on the central front surface of a steering wheel.

It should be appreciated that various constructions, shapes, sizes, positions, etc. explained above in relation to the preferred embodiment are just for illustrative purposes, and that the present invention is not limited to the embodiment described above and may be modified variously without departing from the scope indicated by the appended claims.

For example, whereas the above-described embodiment is constructed to permit appropriate paying-out of the belt by correcting the target take-up position, the present invention is not so limited and may be constructed so as not to perform the target-position following control when a deviation from the target value is below a predetermined level.

Further, the present invention may be arranged to allow the take-up position to be varied, during the vehicle-occupant holding operation control, in response to the passage of time from the start of the vehicle-occupant holding operation and/or other sensor signal. Furthermore, under a predetermined condition where the vehicle-occupant holding operation may be considered to be unnecessary, e.g. when the vehicle is traveling at low velocity, the control on the vehicle-occupant holding operation itself may be limited or prevented from being performed.

The present invention arranged in the above-described manner can be advantageously applied to optimize the belt take-up amount so that excessive belt tension is prevented from being imparted to the vehicle occupant during lateral acceleration or during operation of the VSA (Vehicle Stability Assist) unit, to thereby hold or restrain the vehicle occupant with an optimal holding force during travel of the vehicle.

What is claimed is:

1. A vehicle seat belt apparatus including an electric pretensioner that includes a belt reel and a motor for rotationally driving the belt reel to take up a belt, said vehicle seat belt apparatus comprising:
    a take-up position detector for detecting a take-up position of the belt reel;
    a traveling condition detector for detecting a traveling condition of the vehicle;
    a traveling condition determination apparatus for determining, on the basis of a detection signal output by said traveling condition detector, whether the traveling condition of the vehicle has exceeded a predetermined threshold amount; and
    a control apparatus for controlling power supply to the motor, on the basis of a determination signal output by said traveling condition determination apparatus, to thereby control a driving amount of the motor while also controlling the belt reel, in accordance with the detection signal output by said take-up position detector, so that the belt reel is kept at a predetermined take-up position, to thereby hold a vehicle occupant with the belt;
    wherein said control apparatus is operable to variably select and set a gain level for controlling a rate of power supplied to the motor, depending on sensed operating conditions, in order to adjust the responsiveness of the motor; said sensed operating conditions including a rate of change in the traveling condition and a difference between a current take-up position and a target take-up position;
    wherein when an amount of variation in the traveling condition exceeds the predetermined threshold amount, the gain level is increased so as to make an actual current take-up position of the belt reel approach the target take-up position thereof;
    wherein the control apparatus is operable to determine an upper limit of the power supplied to the motor, based on a difference between the target take-up position of the belt reel and the actual current take-up position thereof; and
    wherein, when an amount of variation in the traveling condition exceeds the predetermined threshold amount, the gain level is increased by an amount corresponding to the sensed difference between the current take-up position and the target take-up position.

2. The vehicle seat belt apparatus of claim 1, wherein the predetermined take-up position is a position where the belt fits a body of the vehicle occupant substantially without slack.

3. The vehicle seat belt apparatus of claim 1, wherein, once said take-up position detector detects that the belt reel has rotated in a belt paying-out direction during a vehicle-occupant holding operation by the belt reel, said control apparatus increases the power supply to the motor.

4. The vehicle seat belt apparatus of claim 1, wherein, once said take-up position detector detects that the belt reel has rotated in a belt taking-up direction during a vehicle-occupant holding operation by the belt reel, said control apparatus reduces the power supply to the motor.

5. The vehicle seat belt apparatus of claim 1, further comprising a rotation angle velocity detector for detecting a variation rate of a rotation angle of the belt reel, wherein, when the rotation angle of the belt reel has varied during a vehicle-occupant holding operation by the belt reel, said control apparatus varies the gain level to the motor in accordance with the rotation angle velocity of the belt reel detected by said rotation angle velocity detector.

6. The vehicle seat belt apparatus of claim 1, wherein, on the basis of an amount of the traveling condition detected by said traveling condition detector, said control apparatus varies the predetermined take-up position or the gain level to the motor during a vehicle-occupant holding operation by the belt reel.

7. The vehicle seat belt apparatus of claim 1, further comprising a turning direction detector for detecting a turning direction of the vehicle, wherein, when the turning direction of the vehicle has varied during a vehicle-occupant holding operation by the belt reel, said control apparatus varies, in accordance with the turning direction detected by said turning direction detector, the predetermined take-up position or the gain level to the motor during the vehicle-occupant holding operation by the belt reel.

8. The vehicle seat belt apparatus of claim 1, further comprising a vehicle occupant detector for detecting the vehicle occupant, wherein said control apparatus varies, in accordance with vehicle occupant information detected by said vehicle occupant detector, the predetermined take-up position or the gain level to the motor during a vehicle-occupant holding operation by the belt reel.

9. The vehicle seat belt apparatus of claim 1, further comprising operation apparatus for varying the predetermined take-up position or the gain level to the motor during a vehicle-occupant holding operation by the belt reel.

10. The vehicle seat belt apparatus of claim 1, further comprising a road surface friction coefficient detector for detecting a road surface friction coefficient, wherein, on the basis of information related to the road surface friction coefficient detection detected by said road surface friction coefficient detector, said control apparatus sets the predetermined take-up position, or the gain level to the motor during a vehicle-occupant holding operation by the belt reel, to a smaller value when a smaller road surface friction coefficient is detected by said road surface friction coefficient detector.

11. The vehicle seat belt apparatus of claim 1, further comprising target take-up position correction apparatus for inhibiting increase of the power supply responsive to variation in the predetermined take-up position during a vehicle-occupant holding operation by the belt reel, and also re-setting a target take-up position by increasing or decreasing the predetermined take-up position.

* * * * *